US007712222B2

(12) United States Patent
Korb et al.

(10) Patent No.: US 7,712,222 B2
(45) **Date of Patent: *May 11, 2010**

(54) COMPOSITE UTILITY BLADE, AND METHOD OF MAKING SUCH A BLADE

(75) Inventors: William B. Korb, Melrose, CT (US); Brian K. Douglas, Enfield, CT (US); Dayananda Sukadhare, Bayside, NY (US); Gary F. Scott, Huntersville, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/793,593

(22) Filed: Mar. 4, 2004

(65) Prior Publication Data

US 2004/0244539 A1 Dec. 9, 2004

Related U.S. Application Data

(60) Provisional application No. 60/451,985, filed on Mar. 5, 2003.

(51) Int. Cl.

| | |
|---|---|
| ***B26B 9/00*** | (2006.01) |
| ***B32B 15/04*** | (2006.01) |
| ***B23K 11/00*** | (2006.01) |

(52) U.S. Cl. .............. 30/346.53; 30/346.54; 30/346.58; 76/104.1; 428/627; 428/683; 428/472

(58) Field of Classification Search ....................... None
See application file for complete search history.

(56) References Cited

U.S. PATENT DOCUMENTS 882,413 A 3/1908 Parkison
1,706,636 A 3/1929 Stine
1,732,244 A 10/1929 Salzman (Continued)

FOREIGN PATENT DOCUMENTS

CA 970661 7/1975

(Continued)

OTHER PUBLICATIONS

Undated Product Catalog for Lutz KG, Solingen, Germany; received by applicant Jun. 1, 2001; pp. 3-20.

(Continued)

*Primary Examiner*—John J Zimmerman
(74) *Attorney, Agent, or Firm*—McCarter & English, LLP

(57) ABSTRACT

A composite utility blade and method of making such a blade involves butt joining a high speed or tool steel wire to a front edge of an alloy steel backing strip. The wire defines a predetermined cross-sectional shape that substantially corresponds to the cross-sectional shape of the cutting edge of the blade. The wire is electron beam welded to the backing strip to form a composite strip defining a first metal portion formed by the alloy steel backing strip, a second metal portion formed by the high speed or tool steel wire, and a weld region joining the first and second metal portions. The composite strip is then annealed, and the annealed strip is straightened to eliminate any camber therein. The annealed composite strip is then hardened such that the first metal portion defines a first surface hardness and the second metal portion defines a second surface hardness greater than the first surface hardness. The hardened strip is then subjected to tempering and quenching cycles, and facets are formed on the edge of the second metal portion to form a straight, tool steel cutting edge. The composite strip is then scored at axially spaced locations to form a plurality of score lines, and the plurality of score lines define a plurality of blade sections there between. The cutting edge may be coated with AlTiN, TiN, or an inner coating of AlTiN and an outer coating of TiN.

44 Claims, 12 Drawing Sheets

U.S. PATENT DOCUMENTS

| | | | | |
|---|---|---|---|---|
| 1,734,554 | A | 11/1929 | Behrman | |
| 2,093,874 | A | 9/1937 | Stargardter | |
| 2,286,047 | A | 6/1942 | Young | |
| 2,287,549 | A | 6/1942 | Carlson | |
| 2,582,913 | A | 1/1952 | Pfefferle | |
| 2,718,162 | A | 9/1955 | Smith | |
| 3,279,283 | A | 10/1966 | Craig | |
| 3,315,548 | A | 4/1967 | Anderson et al. | |
| RE26,676 | E | 9/1969 | Anderson et al. | |
| 3,681,846 | A | 8/1972 | Gerber | |
| 3,685,373 | A | 8/1972 | Norfolk | |
| 3,703,766 | A | 11/1972 | Tibbals | |
| 3,736,828 | A | 6/1973 | Funakubo | |
| 3,766,808 | A | 10/1973 | Cremisio et al. | |
| 3,831,466 | A | 8/1974 | Hicks, Jr. | |
| 3,894,337 | A | 7/1975 | Jones | |
| 3,911,579 | A | 10/1975 | Lane et al. | |
| 4,109,380 | A | 8/1978 | Anderson | |
| 4,232,096 | A | 11/1980 | Franzen et al. | |
| 4,277,888 | A | 7/1981 | Szabo | |
| 4,321,098 | A | 3/1982 | Hayden | |
| 4,470,895 | A * | 9/1984 | Coad et al. | 204/192.15 |
| 4,896,424 | A | 1/1990 | Walker | |
| 4,922,610 | A | 5/1990 | Szabo | |
| 5,015,539 | A | 5/1991 | Daxelmueller et al. | |
| 5,091,264 | A | 2/1992 | Daxelmueller et al. | |
| 5,142,785 | A | 9/1992 | Grewal et al. | |
| 5,283,954 | A | 2/1994 | Szabo | |
| 5,317,938 | A | 6/1994 | de Juan, Jr. et al. | |
| 5,337,482 | A | 8/1994 | Schmidt | |
| 5,417,777 | A | 5/1995 | Henderer | |
| 5,613,300 | A | 3/1997 | Schmidt | |
| 5,724,868 | A | 3/1998 | Knudsen et al. | |
| 5,842,387 | A | 12/1998 | Marcus et al. | |
| 5,940,975 | A | 8/1999 | Decker et al. | |
| 5,946,985 | A | 9/1999 | Carlsen et al. | |
| 6,105,261 | A | 8/2000 | Ecer | |
| 6,309,738 | B1 | 10/2001 | Sakurai | |
| 6,427,573 | B1 | 8/2002 | Carlsen et al. | |
| 6,701,627 | B2 * | 3/2004 | Korb et al. | 30/350 |
| 2002/0017166 | A1 | 2/2002 | Honickl | |
| 2003/0019111 | A1 | 1/2003 | Korb et al. | |
| 2003/0019332 | A1 | 1/2003 | Korb et al. | |
| 2004/0168326 | A1 * | 9/2004 | Korb et al. | 30/350 |

FOREIGN PATENT DOCUMENTS

| | | | |
|---|---|---|---|
| CH | 382595 | | 12/1964 |
| CH | 637057 | | 7/1983 |
| CH | 671917 | | 10/1989 |
| CH | 685152 | | 4/1995 |
| CH | 685482 | | 7/1995 |
| DE | 376421 | | 10/1920 |
| DE | 44 45 755 | A1 | 9/1995 |
| EP | 0 319 511 | B1 | 11/1988 |
| EP | 0 566 560 | B1 | 1/1996 |
| EP | 0 569 349 | B1 | 3/1997 |
| EP | 0 919 322 | A1 | 6/1999 |
| EP | 0 786 302 | B1 | 6/2002 |
| JP | 52-116991 | A | 9/1977 |
| JP | 10-225805 | A | 8/1998 |
| JP | 2002-370192 | A | 12/2002 |
| WO | WO 94/18354 | | 8/1994 |
| WO | WO 98/38346 | | 9/1998 |
| WO | WO 98/38347 | | 9/1998 |

OTHER PUBLICATIONS

Undated Product Catalog, Mozart AG, Solingen, Germany; received by applicant May 31, 2001; pp. 1-6 with inserts.

Product Catalog, American Safety Razor Company, Verona, Virginia; Jul. 1999; pp. 1-21.

Supplemental Price List, American Safety Razor Company, Verona, Virginia; 1998; pp. 1-2.

Undated Industrial/DIY Product Catalog, The Jewel Razor Company Ltd., Sheffield, England; pp. 2-5.

Undated Product Catalog, U.S. Blade Manufacturing Company, Cranford, New Jersey; pp. 1-11.

Undated Design Catalog, Karl Fuhr GmbH & Co. KG., West Germany; pp. 1-7.

Teer, D.G., et al., "Self Lubricating coatings for the Protection of Cutting and Forming Tools and Mechanical Components", Oct. 2000, Society of Vacuum Coaters, Albuquerque, New Mexico; pp. 48-54.

Group PVT GMBH LLC, "UCT CzechCoating SwissCoating", Group PVT GmbH LLC, undated; pp. 1-28.

The Fenn Manufacturing Company, "Wire Flattening Lines, Wire Shaping Lines", The Fenn Manufacturing Company, Newington, Connecticut, undated; pp. 1-6.

The Fenn Manufacturing Company, "Fenn Precision copper Commutator Bar Line", The Fenn Manufacturing Company, Newington, Connecticut, undated; p. 1.

International Search Report and Written Opinion, PCT/US04/06668, Dated Jun. 30, 2005.

Undated Szabo Document with English Translation.

S. Szabo AG Trademark Registration with English Translation of Line Items.

Supplementary European Search Report for European Patent Application No. EP 04 71 7441.

* cited by examiner

COMPOSITE UTILITY BLADE, AND METHOD OF MAKING SUCH A BLADE

CROSS-REFERENCE TO RELATED APPLICATIONS

This patent application claims the benefit of U.S. provisional patent application Ser. No. 60/451,985, filed Mar. 5, 2003, entitled "Composite Utility Knife Blade, And Method Of Making Such A Blade". The foregoing patent application is assigned to the Assignee of the present invention and is hereby expressly incorporated by reference as part of the present disclosure.

FIELD OF THE INVENTION

The present invention relates to utility blades, and more particularly, to composite utility blades wherein the outer cutting edge of the blade is made of a highly wear-resistant alloy, and a backing portion of the blade is made of an alloy selected for toughness, such as spring steel. The present invention also relates to methods of making such composite utility blades.

BACKGROUND INFORMATION

Conventional utility blades are made of carbon steel and define a back edge, a cutting edge located on an opposite side of the blade relative to the back edge, and two side edges located on opposite sides of the blade relative to each other and extending between the back and cutting edges of the blade. A pair of notches are typically formed in the back edge of the blade for engaging a locator in a blade holder. Typically, the back, cutting and side edges of the blade define an approximately trapezoidal peripheral configuration. However, prior art utility blades have been commercially available for many years in a variety of shapes other than trapezoidal, such as rectangular or hooked blades. In addition, prior art utility blades have been provided in snap-off configurations wherein a single blade includes axially spaced score lines and separable blades or blade segments therebetween.

Conventional utility blades are manufactured by providing a carbon steel strip, running the strip through a punch press to punch the notches at axially spaced locations on the strip, and stamping a brand name, logo or other identification thereon. Then, the strip is scored to form a plurality of axially spaced score lines, wherein each score line corresponds to a side edge of a respective blade and defines a preferred breaking line for later snapping the scored strip into a plurality of blades. The punched and scored strip is then wound again into a coil, and the coil is hardened and tempered. The hardening and tempering operations may be performed in a "pit-type" vacuum furnace wherein the coils are repeatedly heated and cooled therein. Alternatively, the hardening and tempering operations may be performed "in-line", wherein the strip is unwound from the coil and successively driven through a series of furnaces and quenching stations to harden and temper the strip. The carbon steel strip is typically heat treated to a surface hardness of about 58 Rockwell "c" ("Rc"), and thus defines a relatively hard and brittle structure.

The heat treated strip is then ground, honed and stropped in a conventional manner to form the facets defining a straight cutting edge along one side of the strip. Then, the strip is snapped at each score line to, in turn, break the strip along the score lines and thereby form from the strip a plurality of trapezoidal or other shaped utility blades. Because the entire strip is relatively hard and brittle (about 58 Rc), the strip readily breaks at each score line to thereby form clean edges at the side of each blade.

One of the drawbacks associated with such conventional utility blades is that each blade is formed of a single material, typically carbon steel, which is heat treated to a relatively hard and brittle state, typically about 58 Rc. Thus, although such blades define a relatively hard, wear-resistant cutting edge, the entire blade is also relatively brittle, and therefore is subject to premature breaking or cracking in use. In addition, the cutting edges of such conventional blades are frequently not as wear resistant as might otherwise be desired. However, because the entire blade is made of the same material, any increase in hardness, and thus wear resistance of the cutting edge, would render the blade too brittle for practical use. As a result, such conventional utility blades are incapable of achieving both the desired wear resistance at the cutting edge, and overall toughness to prevent cracking or premature breakage during use. Another drawback of such conventional utility blades is that the carbon steel typically used to make such blades corrodes relatively easily, thus requiring premature disposal of the blades and/or costly coatings to prevent such premature corrosion.

Certain prior art patents teach composite utility blades defining sandwiched, laminated, or coated constructions. For example, U.S. Pat. No. 4,896,424 to Walker shows a utility knife having a composite cutting blade formed by a body section 16 made of titanium, and a cutting edge section 18 made of high carbon stainless steel and connected to the body section by a dovetail joint 25.

U.S. Pat. Nos. 3,279,283, 2,093,874, 3,681,846, and 6,105,261 relate generally to laminated knives or razor blades having cutting edges formed by a core layer made of a high carbon steel or other relatively hard material, and one or more outer layers made of relatively softer materials. Similarly, U.S. Pat. Nos. 3,911,579, 5,142,785, and 5,940,975 relate to knives or razor blades formed by applying a relatively hard carbon coating (or diamond like coating ("DLC")) to a steel substrate. In addition, U.S. Pat. Nos. 5,317,938 and 5,842,387 relate to knives or razor blades made by etching a silicon substrate.

One of the drawbacks associated with these laminated, sandwiched and/or coated constructions, is that they are relatively expensive to manufacture, and therefore have not achieved widespread commercial use or acceptance in the utility blade field.

In stark contrast to the utility blade field, bi-metal band saw blades have been used in the saw industry for many years. For example, U.S. Reissue Pat. No. 26,676 shows a method of making bi-metal band saw blades wherein a steel backing strip and high speed steel wire are pre-treated by grinding and degreasing, and the wire is welded to the backing strip by electron beam welding. Then, the composite band stock is straightened and annealed. The sides of the annealed stock are then dressed, and the band saw blade teeth are formed in the high speed steel edge of the composite stock by milling. Then, the teeth are set and the resulting saw blade is heat treated. There are numerous methods known in the prior art for heat treating such band saw blades. For example, International Published Patent Application No. WO 98/38346 shows an apparatus and method for in-line hardening and tempering composite band saw blades wherein the blades are passed around rollers and driven repeatedly through the same tempering furnace and quenching zones. The heat treated composite band saw blades are then cleaned and packaged.

Although such bi-metal band saw blades have achieved widespread commercial use and acceptance over the past 30 years in the band saw blade industry, there is not believed to be any teaching or use in the prior art to manufacture utility blades defining a bi-metal or other composite construction as with bimetal band saw blades. In addition, there are numerous obstacles preventing the application of such band saw blade technology to the manufacture of utility blades. For example, as described above, conventional utility blades are manufactured by forming score lines on the carbon steel strip, and then snapping the strip along the score lines to break the strip into the trapezoidal or other shaped blades. However, the relatively tough, spring-like backing used, for example, to manufacture bi-metal band saw blades, can be relatively difficult to score and snap in comparison to conventional carbon steel utility blades. In addition, the heat treating applied to conventional utility blades could not be used to heat treat bimetal or other composite utility blades.

The high speed or tool steels used to manufacture wear-resistant cutting edges, such as the wear-resistant cutting edges in prior art band saw blades, are relatively expensive in comparison, for example, to the carbon steels used to manufacture conventional utility blades. In addition, the grinding and honing operations involved in forming wear-resistant cutting edges from high speed and tool steels can create significant amounts of scrap and/or waste of these expensive materials.

Accordingly, it is an object of the present invention to overcome one or more of the above-described drawbacks and disadvantages of prior art utility blades and/or methods of making such blades, and to provide a bi-metal or other composite utility blade defining a relatively hard, wear-resistant cutting edge, and a relatively tough, spring-like backing, and a method of making such utility blades.

SUMMARY OF THE INVENTION

One aspect of the present invention is directed to a composite utility blade comprising a back edge, a cutting edge located on an opposite side of the blade relative to the back edge, and two side edges located on opposite sides of the blade relative to each other and extending between the back and cutting edges of the blade. In one embodiment of the present invention, the back, cutting and side edges of the blade define an approximately trapezoidal peripheral configuration. However, the blades of the present invention may take any of numerous different shapes and configurations, including rectangular, hooked, and snap-off blades. The composite utility blade of the present invention further defines first and second metal portions, wherein the first metal portion extends between the back edge and the second metal portion, and further extends from approximately one side edge to the other side edge of the blade. The first metal portion is formed of an alloy steel heat treated to a first hardness that is preferably within the range of approximately 38 Rc to approximately 52 Rc. The second metal portion defines the cutting edge, and extends from approximately one side edge to the other side edge, and is formed of a high speed or tool steel heat treated to a second hardness that is greater than the first hardness, and preferably within the range of approximately 60 Rc to approximately 75 Rc. A weld region of the blade joins the first and second metal portions and extends from approximately one side edge to the other side edge of the blade.

Another aspect of the present invention is directed to a method of making composite utility blades. In accordance with one embodiment of the present invention, the method comprises the steps of providing an elongated wire formed of high speed or tool steel, and an elongated backing strip formed of an alloy steel and defining an approximately planar upper side, an approximately planar lower side, and opposing back and front edges extending between the upper and lower sides. The wire is butt joined to the front edge of the backing strip. Then, thermal energy is applied to the interface between the wire and backing strip to weld the wire to the backing strip and, in turn, form a composite strip defining a first metal portion formed by the steel backing strip, a second metal portion formed by the high speed steel wire, and a weld region joining the first and second metal portions. The composite strip is then annealed, and the annealed strip is straightened to eliminate any camber or other undesirable curvatures in the annealed composite strip. Then, a plurality of notches are formed, such as by punching, in axially spaced locations relative to each other along the back edge of the first metal portion and/or at other desired locations of the annealed composite strip. The annealed and punched composite strip is then hardened such that the first metal portion defines a first surface hardness that is preferably within the range of approximately 38 Rc to approximately 52 Rc, and the second metal portion defines a second surface hardness greater than the first surface hardness, and preferably within the range of approximately 60 Rc to approximately 75 Rc. The hardened strip is then subjected to at least one, and preferably two, tempering and quenching cycles. Then, facets are formed on the edge of the second metal portion, such as by grinding, honing and stropping, to in turn form an approximately straight, high speed or tool steel cutting edge along the side of the composite strip opposite the back edge of the first metal portion. The composite strip is then die cut, bent and/or snapped, or otherwise separated along shear or score lines axially spaced relative to each other to form a plurality of utility blades from the strip. In a currently preferred embodiment of the present invention, each utility blade defines an approximately trapezoidal peripheral configuration and at least one notch is formed in the back edge thereof. However, the blades of the present invention may take any of numerous different shapes and configurations, including rectangular, hooked, and snap-off blades.

In accordance with an alternative embodiment of the present invention, prior to hardening, the high speed or tool steel edge of the composite strip is cut to form notches, such as by punching, at the interface of each shear or score line and the second metal portion. The notches are formed to separate the high speed steel cutting edges of adjacent composite utility blades formed from the composite strip, to facilitate bending and snapping the blades from the composite strip, and/or to shape the corners of the cutting edges of the blades.

In accordance with another embodiment of the present invention, the composite strip is scored at axially spaced locations relative to each other to form a plurality of score lines, wherein each score line is oriented at an acute angle relative to the back edge of the first metal portion, and the plurality of score lines define a plurality of blade sections and scrap sections located between the blade sections. In the trapezoidal blade configuration, the scrap sections are approximately triangular and the blade sections are approximately trapezoidal. As described above, notches are preferably formed at the interface of each score line and the second metal portion to facilitate separation of the blades from the composite strip and to shape the corners of the cutting edges of the blades. In order to separate the blades from the composite strip, each scrap section is bent outwardly relative to a plane of the composite strip on one side of a respective score line. Upon bending each scrap section, the composite strip is pressed on an opposite side of the respective score line to, in turn, break the blade section away from the bent scrap section along the respective score line. This process is repeated at each score line, or is performed substantially simultaneously for each pair or other group of score lines defining each respective utility blade, to thereby form the plurality of blades from the composite strip.

In accordance with another aspect, the present invention is directed to a method of making a composite utility blade. The blade includes a first metal portion forming a backing, a second metal portion forming a cutting edge and defining a first predetermined cross-sectional shape, and a weld region joining the first and second metal portions. The method comprises the steps of:

(i) providing an elongated backing strip formed of steel, wherein the elongated backing strip includes a first side, a second side, and opposing edges extending between the first and second sides;

(ii) providing an elongated wire formed of wear-resistant steel and defining a second predetermined cross-sectional shape substantially corresponding to the first predetermined cross-sectional shape of the second metal portion of the blade;

(iii) placing the wire in contact with an edge of the backing strip;

(iv) applying thermal energy to the interface between the wire and backing strip to weld the wire to the backing strip and, in turn, forming a composite strip defining a first metal portion formed by the steel backing strip, a second metal portion formed by the wear-resistant steel wire having substantially the second predetermined cross-sectional shape, and a weld region joining the first and second metal portions;

(v) heat treating the composite strip; and (vi) forming at least one facet on the second metal portion and, in turn, forming a wear-resistant steel cutting edge on the composite strip.

In one embodiment of the present invention, the step of providing an elongated wire includes providing a wire that defines an initial cross-sectional shape, and then shaping the wire into the second predetermined cross-sectional shape that is different than the initial cross-sectional shape. Preferably, the wire is shaped into the second predetermined cross-sectional shape prior to welding the wire to the backing strip. Also in one embodiment of the present invention, the initial cross-sectional shape of the wire is substantially round, and the second predetermined cross-sectional shape of the wire is multi-faceted. Preferably, the second predetermined cross-sectional shape of the wire is selected from the group including: (a) substantially rectangular; (b) substantially trapezoidal; (c) substantially triangular; (d) substantially parallelogram-shaped; and (d) a combination of substantially rectilinear and triangular. Also in currently preferred embodiments of the present invention, the step of shaping the wire into the second predetermined cross-sectional shape includes at least one of: (a) rolling the wire; (b) passing the wire through a Turks Head; and (c) passing the wire through a draw die.

In one embodiment of the present invention, the method further comprises the step of coating the wear-resistant cutting edge with at least one of TiN and AlTiN. In one such embodiment, the method further comprises the steps of coating the wear-resistant cutting edge with an inner layer of AlTiN and an outer layer of TiN. In one such embodiment, the method further comprises the step of applying the AlTiN coating in a gradient such that there is a lower concentration of aluminum at the inner side of the coating and a higher concentration of aluminum at the outer side of the coating.

In accordance with another aspect, the present invention is directed to a composite strip for forming therefrom at least one utility blade. The blade includes a first metal portion forming a backing, a second metal portion forming a cutting edge and defining a first predetermined cross-sectional shape, and a weld region joining the first and second metal portions. The composite strip comprises a first metal portion defined by an elongated backing strip formed of steel, wherein the elongated backing strip defines a first side, a second side, and opposing edges extending between the first and second sides. A second metal portion of the strip defines a second predetermined cross-sectional shape substantially corresponding to the first predetermined cross-sectional shape of the second metal portion of the blade, and is defined by an elongated wire formed of wear-resistant steel and having substantially the second predetermined cross-sectional shape. A weld region of the strip joins the first and second metal portions.

In one embodiment of the present invention, the second predetermined cross-sectional shape of the wire and the first predetermined cross-sectional shape of the second metal portion are selected from the group including: (a) substantially rectangular; (b) substantially trapezoidal; (c) substantially triangular; (d) substantially parallelogram-shaped; and (d) a combination of substantially rectilinear and triangular. In one such embodiment, the second predetermined cross-sectional shape of the wire is substantially the same as the first predetermined cross-sectional shape of the second metal portion of the blade.

In one embodiment of the present invention, the composite strip further comprises at least one of an AlTiN coating and a TiN coating. In one such embodiment, the composite strip comprises an inner AlTiN coating and an outer TiN coating. In one such embodiment, the coatings define a strip extending along opposite sides of the cutting edge relative to each other.

One advantage of the utility blades of the present invention, is that they provide an extremely hard, wear-resistant cutting edge, and an extremely tough, spring-like backing, particularly in comparison to the conventional utility blades as described above. Thus, the utility blades of the present invention provide significantly improved blade life, and cutting performance throughout the blade life, in comparison to conventional utility blades. In addition, the utility blades, and methods of making such blades, are relatively cost effective, particularly in comparison to the composite utility blades defining sandwiched, laminated and/or coated constructions, as also described above. As a result, the utility blades of the present invention provide a combination of wear resistance, toughness, cutting performance, and cost effectiveness heretofore believed to be commercially unavailable in utility blades.

Other objects and advantages of the present invention will become readily apparent in view of the following detailed description of preferred embodiments and accompanying drawings.

DETAILED DESCRIPTION OF THE PREFERRED EMBODIMENTS

Figure 1:
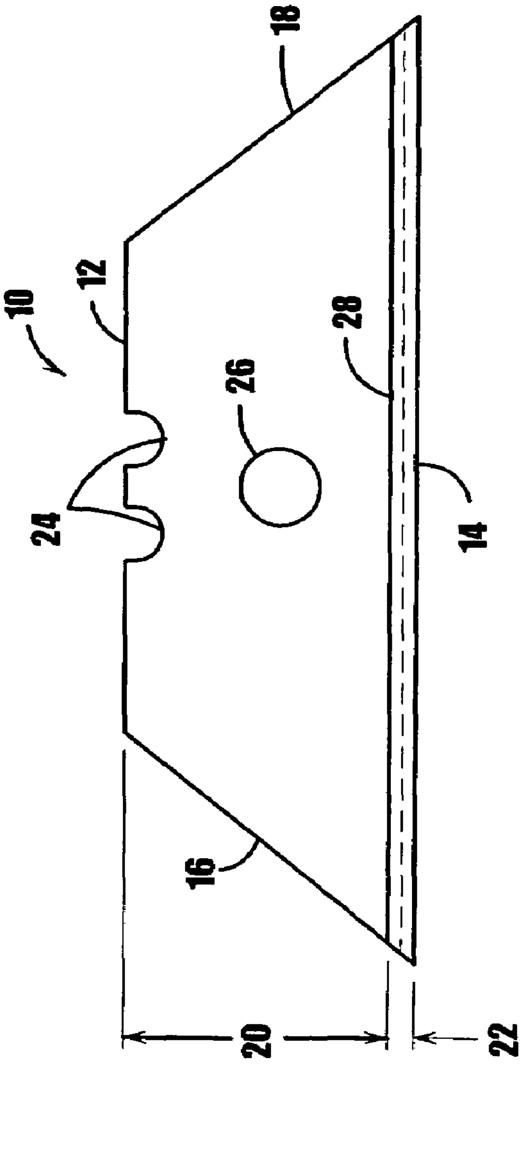
FIG. 1 is a top plan view of a composite utility blade embodying the present invention.

In FIG. 1, a composite utility blade embodying the present invention is indicated generally by the reference numeral 10. The utility blade 10 defines a back edge 12, a cutting edge 14 located on an opposite side of the blade relative to the back edge, and two side edges 16, 18 located on opposite sides of the blade relative to each other and extending between the back and cutting edges of the blade. As shown typically in FIG. 1, in the illustrated embodiment of the present invention, the back, cutting and side edges of the blade preferably define an approximately trapezoidal peripheral configuration. However, as described further below with reference to FIGS. 11A-11D, the utility blade of the present may take any of numerous different shapes or configurations that currently or later become known, including, for example, a square or parallelogram shape, and/or any desired shape with squared, rounded or oblique cutting corners.

The blade 10 further defines a first metal portion 20 and a second metal portion 22. As shown typically in FIG. 1, the first metal portion 20 extends between the back edge 12 and the first metal portion 22, and further extends from approximately one side edge 16 to the other side edge 18. In accordance with the present invention, the first metal portion 20 is formed of a steel, typically referred to as an "alloy" steel, that is heat treated to a surface hardness within the range of approximately 38 Rockwell "c" (referred to herein as "Rc") to approximately 52 Rc. The second metal portion 22 defines the cutting edge 14 and extends from approximately one side edge 16 to the other side edge 18. In accordance with the present invention, the second metal portion 22 is formed of a steel, typically referred to as a "high speed" or "tool" steel, that is heat treated to a surface hardness within the range of approximately 60 Rc to approximately 75 Rc.

The first metal portion 20 defines a spring-like backing that is relatively pliable, tough, and thus highly resistant to fatigue and cracking. The second metal portion 22, on the other hand, is relatively hard and highly wear resistant, and thus defines an ideal, long-lasting cutting blade. As a result, the composite utility blades of the present invention define highly wear-resistant, long-lasting cutting edges, combined with virtually unbreakable or shatterproof backings (and thus shatter-proof blades). Thus, in stark contrast to the typical utility blades of the prior art, the composite utility blades of the present invention provide a cost-effective blade exhibiting both improved wear resistance and toughness heretofore commercially unavailable in such blades.

The first metal portion 20 of blade 10 is preferably made of any of numerous different grades of steel capable of being heat treated to a surface hardness within the preferred range of approximately 38 Rc to approximately 52 Rc, such as any of numerous different alloy steels or standard AISI grades, including without limitation 6135, 6150 and D6A. The second metal portion 22, on the other hand, is preferably made of any of numerous different types of wear-resistant steel capable of being heat treated to a surface hardness within the preferred range of approximately 60 Rc to approximately 75 Rc, including any of numerous different tool steels or high-speed steels, such as any of numerous different standard AISI grades, including, without limitation, M Series grades, such as M1, M2, M3, M42, etc., A Series grades, such as A2, A6, A7 A9, etc., H Series grades, such as H10, H11, H12, H13, etc., T Series grades, such as T1, T4, T8, etc., and W, S, O, D and P Series grades.

As may be recognized by those skilled in the pertinent art based on the teachings herein, the currently preferred materials used to construct the first and second metal portions 20 and 22 and disclosed herein are only exemplary, and numerous other types of metals that are currently or later become known for performing the functions of the first and/or second metal portions may be equally employed to form the composite utility blades of the present invention.

As further shown in FIG. 1, each composite utility blade 10 defines a pair of cut outs or notches 24 formed in the back edge 12 and laterally spaced relative to each other. As shown typically in FIG. 1, each notch 24 defines a concave, approximately semi-circular profile, and is provided to engage a corresponding locator mounted within a blade holder (not shown) in order to retain the blade in the blade holder. As may be recognized by those skilled in the pertinent art based on the teachings herein, the notches 24 may take any of numerous different shapes and/or configurations in any of numerous different locations, and the blade may include any number of such notches or other recesses that are currently or later become known to those skilled in the pertinent art for performing the function of engaging a blade holder, or the blade actuating mechanism or locator of such a holder.

As also shown in FIG. 1, the blade 10 further defines a registration aperture 26 extending through the first metal portion in an approximately central portion of the blade. As described further below, the registration aperture 26 is provided to receive a blade positioning device to position the blade in a die, in a blade bending and snapping apparatus, or other blade forming device used during the process of making the blades in accordance with the present invention. As may be recognized by those skilled in the pertinent art based on the teachings herein, the aperture 26 may take any of numerous different shapes or configurations, and the blade may include any number of such apertures or other structural features for performing the function of properly positioning the blade in a die or other manufacturing apparatus. In addition, the registration aperture(s) 26 may be located in any of numerous different locations on the utility blade, or may be located within the scrap material adjacent to the blade and within the bimetal strip from which the blade is formed.

As further shown in FIG. 1, the blade 10 defines a weld region 28 formed between the first and second metal portions 20 and 22, respectively, and defining an approximate line of joinder extending from one side edge 16 to the other side edge 18. As described in further detail below, the second metal portion is joined to the first metal portion 20 by applying thermal energy to the interface, such as by electron beam welding, to thereby weld the first metal portion to the second metal portion and form a resulting weld region defining a line of joinder between the two different metal portions.

Figure 2:
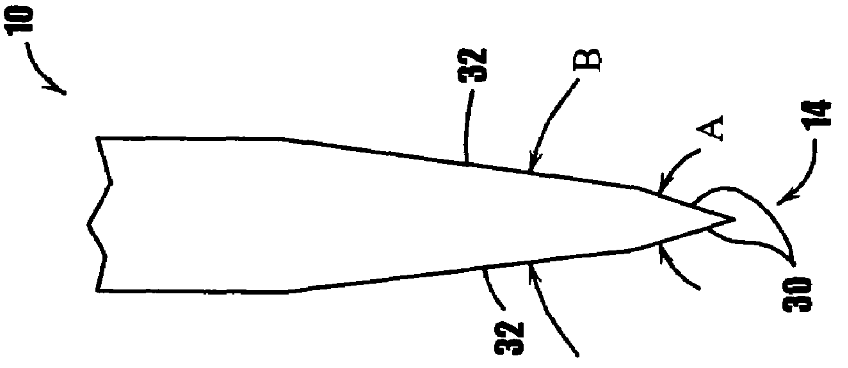
FIG. 2 is partial, end elevational view of the composite utility blade of FIG. 1 showing the multi-faceted cutting edge of the blade.

As also shown in FIG. 1, the cutting edge 14 defines an approximately straight cutting edge extending from one side edge 16 to the other side edge 18. As shown in FIG. 2, the cutting edge 14 preferably defines first facets 30 located on opposite sides of the blade relative to each other, and second facets 32 spaced laterally inwardly and contiguous to the respective first facets 30. As shown typically in FIG. 2, the first facets 30 define a first included angle "A", and the second facets 32 define a second included angle "B". Preferably, the second included angle B is less than the first included angle A. In one embodiment of the present invention, the first included angle A is approximately 26° and the second included angle B is approximately 18°. However, as may be recognized by those skilled in the pertinent art based on the teachings herein, these included angles are only exemplary and may be set as desired depending upon the physical properties and/or proposed applications of the blade. As may be further recognized by those skilled in the pertinent art, the utility blades of the present invention may include any number of facets.

Figure 3A:
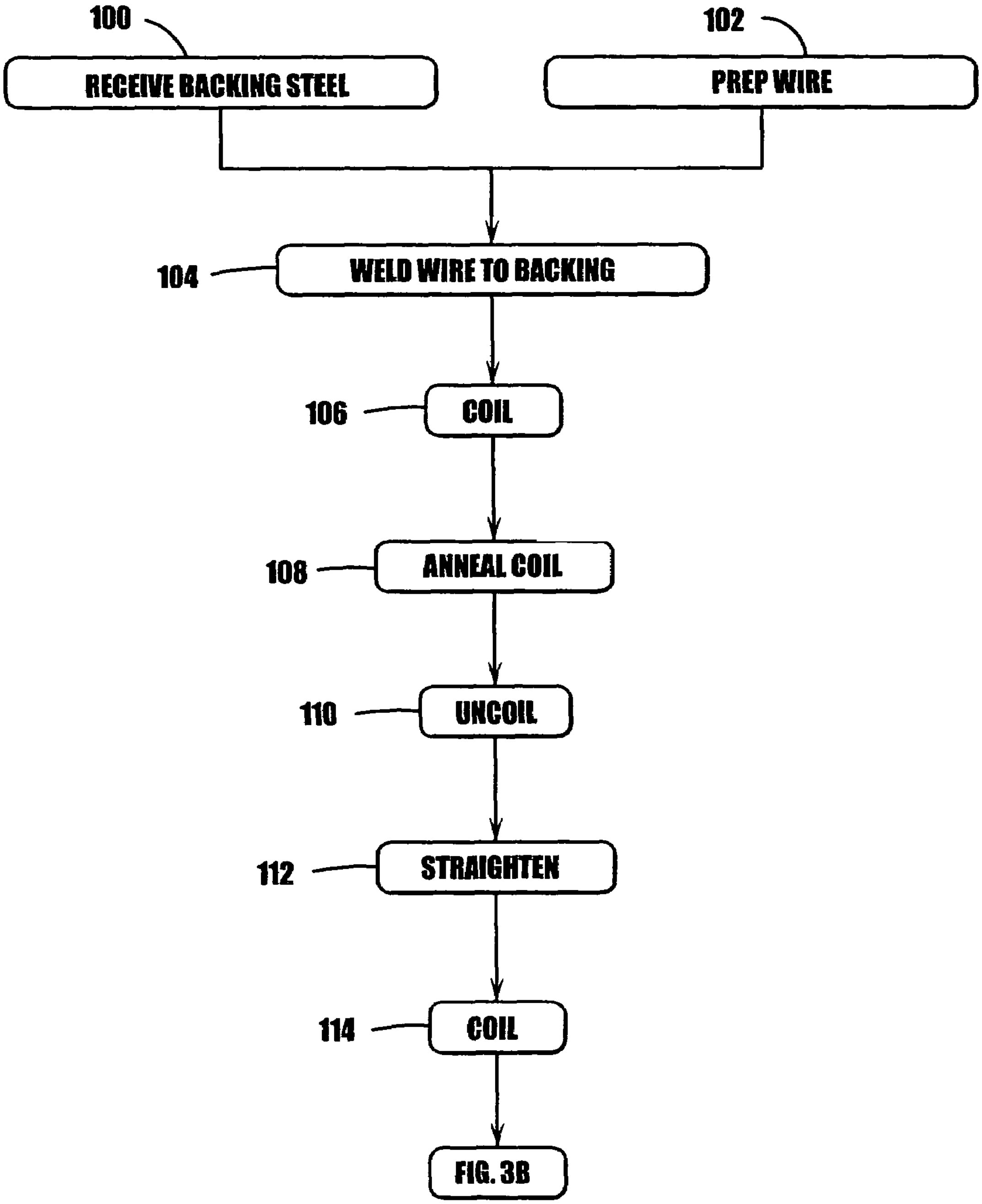
FIGS. 3A and 3B are flow charts illustrating conceptually the procedural steps involved in a method of making the composite utility blades in accordance with certain embodiments of the present invention.
Figure 3B:
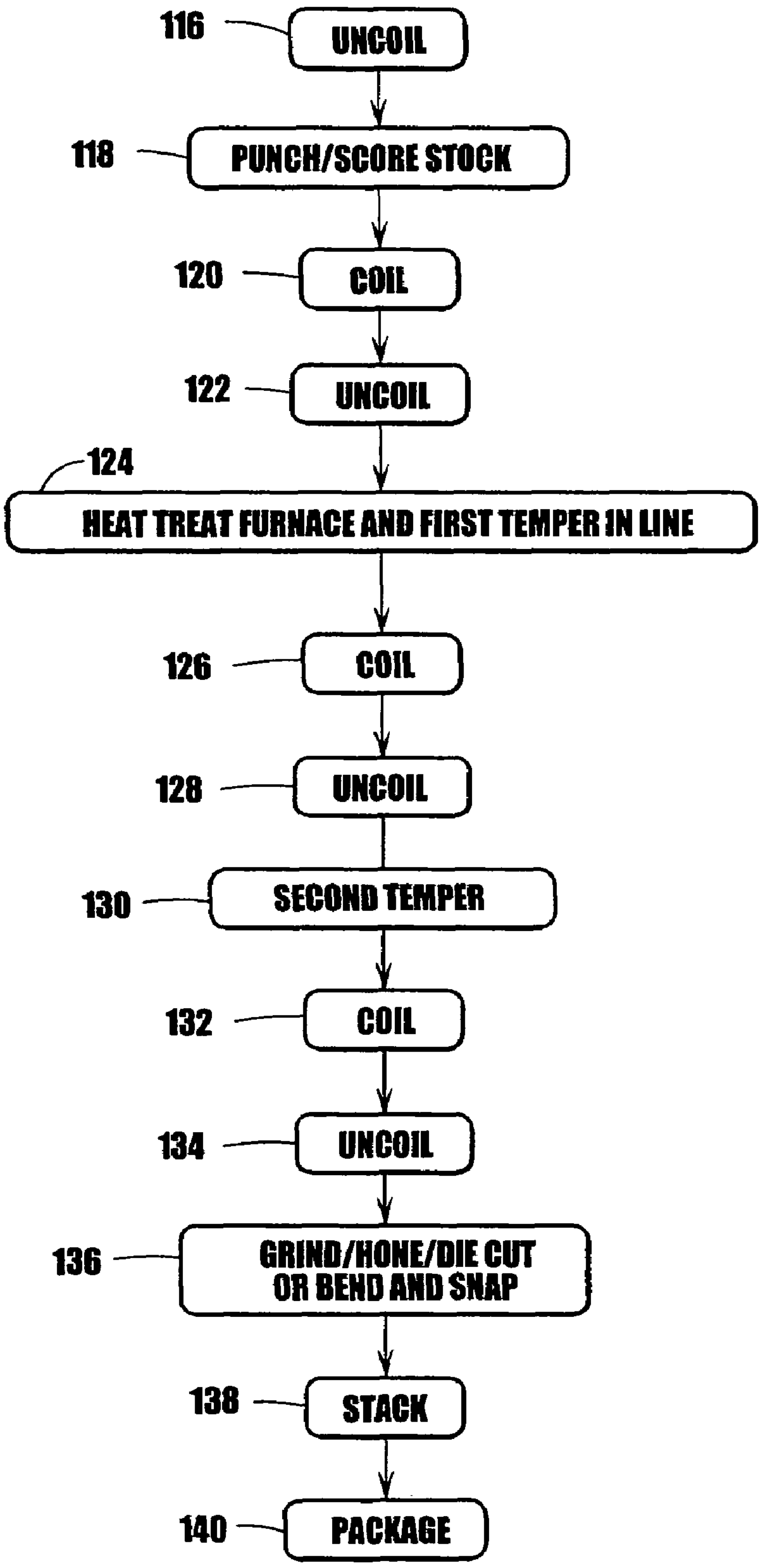
Figure 4:
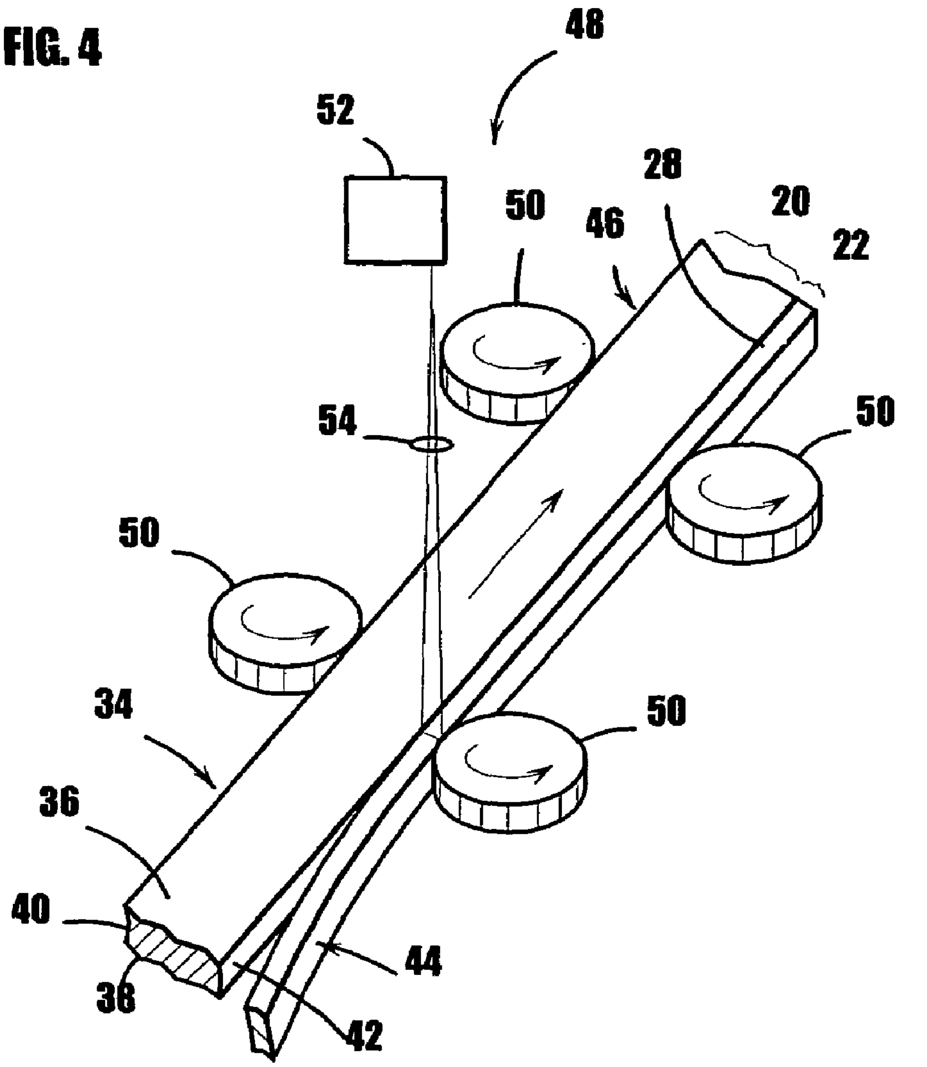
FIG. 4 is a somewhat schematic, perspective view of an apparatus for welding a high speed steel wire to a spring-steel backing to form bi-metal utility blades in accordance with certain embodiments of the present invention.

Turning to FIGS. 3A and 3B, a method of making the composite utility blades of the present invention is hereinafter described in further detail. As shown at steps 100 and 102, the backing steel forming the first metal portion 20 and the high speed or tool steel wire forming the second metal portion 22 are cleaned and otherwise prepared for welding in a manner known to those of ordinary skill in the pertinent art. As shown in FIG. 4, the backing steel is preferably provided in the form of one or more continuous elongated strips 34 wound into one or more coils. Each backing strip 34 defines an approximately planar upper side 36, an approximately planar lower side 38, and opposing back and front edges 40 and 42, respectively. Similarly, the high speed steel wire is preferably provided in the form of one or more continuous lengths of wire 44 wound into one or more coils.

At step 104 of FIG. 3A, the high speed or tool steel wire 44 is butt joined to the front edge 42 of the backing strip 34, and thermal energy is applied to the interface between the wire and the backing strip to, in turn, weld the wire to the backing strip and form a bimetal or composite strip 46 defining the first metal portion 20 formed by the steel backing strip 34, the second metal portion 22 formed by the high speed steel wire 44, and the weld region 28 joining the first and second metal portions. As shown in FIG. 4, a typical welding apparatus 48 includes opposing rollers 50 laterally spaced relative to each other for butt joining the high speed steel wire 44 to the front edge 42 of the backing strip 34, and rotatably driving the composite or bimetal strip 46 through the welding apparatus. A thermal energy source 52 is mounted within the welding apparatus 48 and applies thermal energy to the interface of the high speed steel wire 44 and front edge 42 of the backing strip to weld the wire to the backing strip. In the currently preferred embodiment of the present invention, the thermal energy source 52 transmits an electron beam 54 onto the interface of the high speed steel wire and backing strip to electron beam weld the wire to the backing strip. However, as may be recognized by those skilled in the pertinent art based on the teachings herein, any of numerous other energy sources and/or joining methods that are currently or later become known for performing the functions of the electron beam welding apparatus may be equally employed in the method of the present invention. For example, the energy source for welding the high speed steel wire to the backing strip may take the form of a laser or other energy source, and welding processes other than electron beam welding may be equally used. As described further below in connection with FIGS. 12A through 12F, the high speed or tool steel wire 44 may be pre-shaped to define a predetermined cross-sectional shape that is the same as, or otherwise that substantially corresponds to the cross-sectional shape of the second metal portion 22, and then the pre-shaped wire may be welded to the backing strip as described above. As also described further below, pre-shaping the wire in this manner can reduce the amount of scrap and/or waste of the high speed or tool steel wire during grinding, and further, can reduce the amount of grinding and thus can reduce the overall cost of the blades.

As shown at step 106 of FIG. 3A, after welding the wire to the backing strip, the bimetal strip 46 may then be coiled for annealing and/or for transporting the strip to an annealing station. As shown at step 108, the bi-metal strip 46 is annealed in a manner known to those of ordinary skill in the pertinent art. Typically, the bi-metal strips 46 are annealed in a vacuum furnace of a type known to those of ordinary skill in the pertinent art wherein a plurality of coils are vertically mounted relative to each other on a thermally conductive rack, and the rack is mounted in an evacuated furnace to soak the coils at a predetermined annealing temperature for a predetermined period of time. In the currently preferred embodiment of the present invention, the bimetal strips 46 are annealed at a temperature within the range of approximately 1400° F. to approximately 1600° F. for up to approximately 5 hours. Then, the heated coils are allowed to cool at a predetermined rate in order to obtain the desired physical properties. For example, the coils may be cooled within the evacuated furnace initially at the rate of about 50° F. per hour until the coils reach approximately 1000° F., and then the coils may be allowed to cool at a more rapid rate. As may be recognized by those skilled in the pertinent art based on the teachings herein, these temperatures and times are only exemplary, however, and may be changed as desired depending upon any of numerous different factors, such as the particular materials, constructions and/or dimensions of the bimetal strip 46, the type of welding process used to weld the wire to the backing, and/or the desired physical properties of the resulting blades.

After annealing, the bi-metal strip 46 is then uncoiled, if necessary, as shown at step 110, and the strip is straightened, as shown at step 112. After welding and annealing, the bi-metal strip 46 may develop a significant camber or other undesirable curvatures, and therefore such curvatures must be removed prior to further processing. In the currently preferred embodiment of the present invention, the bimetal strip 46 is mechanically straightened by passing the strip through a series of pressurized rolls in a straightening apparatus of a type known to those of ordinary skill in the pertinent art, such as the Bruderer™ brand apparatus. However, as may be recognized by those skilled in the pertinent art based on the teachings herein, any of numerous straightening apparatus that are currently or later become known for performing the function of straightening metal articles like the bi-metal strip 46 may be equally employed. For example, as an alternative to the mechanical straightening apparatus, the bimetal strip 46 may be straightened by applying heat and tension thereto in a manner known to those of ordinary skill in the pertinent art.

Figure 5:
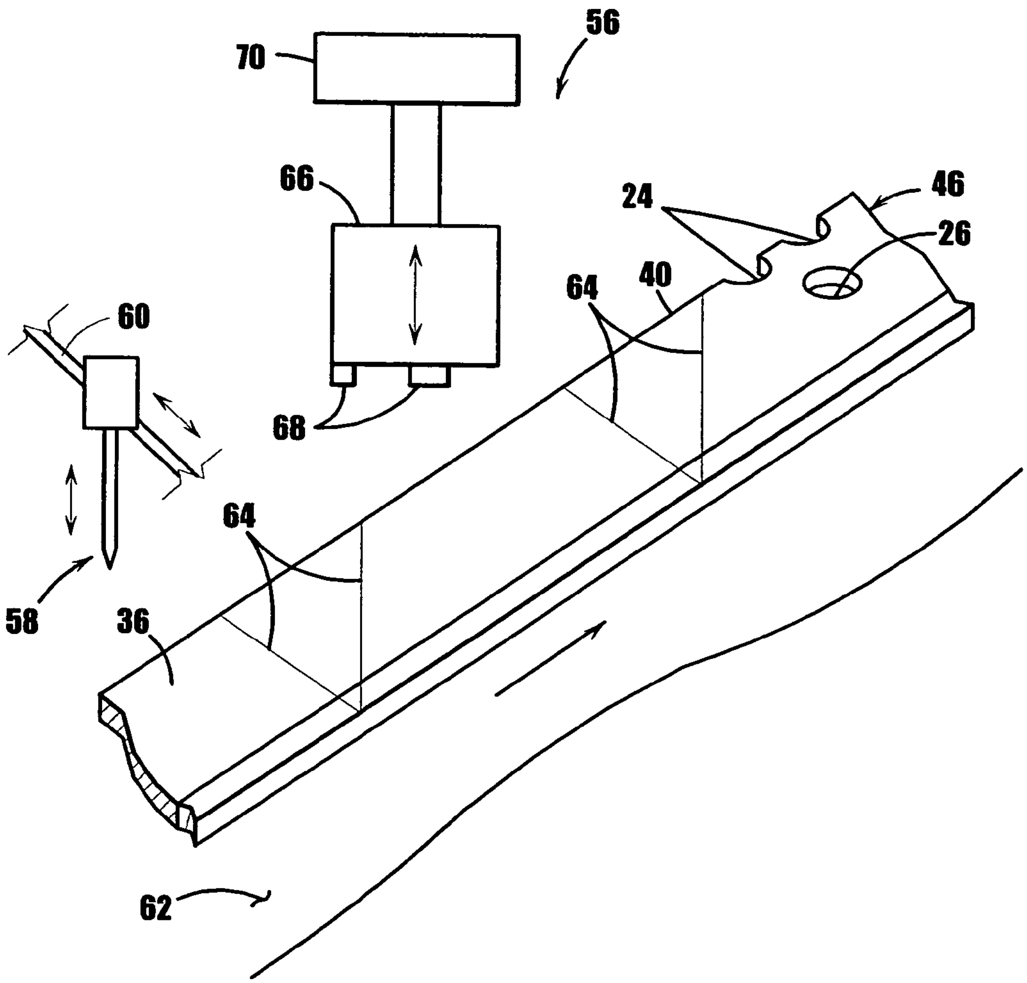
FIG. 5 is a somewhat schematic, perspective view of an apparatus for scoring and punching bi-metal strips in order to make bi-metal utility blades in accordance with one embodiment of the present invention.

As shown at step 114, the straightened bimetal strip 46 may be coiled again, if necessary, for transportation and further processing. As shown at step 116 of FIG. 3B, the annealed and straightened bi-metal strip 46 is then uncoiled, if necessary. At step 118, the bimetal strip is punched to form a plurality of notches or other cut outs 24 axially spaced relative to each other along the back edge 40 of the annealed bi-metal strip, if desired or otherwise required, and is scored to form a plurality of score lines defining the side edges 16 and 18 of each blade. As shown in FIG. 5, a typical apparatus for performing the punching and scoring operations on the bi-metal strip 46 is indicated generally the reference numeral 56. The apparatus 56 includes a scoring tool or instrument 58 mounted on a support 60 above a work support surface 62 supporting the bi-metal strip 46 thereon. As indicated by the arrows in FIG. 5, the scoring instrument is movable vertically into and out of engagement with the bi-metal strip, and may be movable laterally relative to the strip. Thus, as shown typically in FIG. 5, the scoring tool 58 is controlled to engage the upper surface 36 of the bi-metal strip and move into and/or laterally across the strip to, in turn, score the upper surface of the strip and thereby form a plurality of score lines 64 axially spaced relative to each other on the strip and each defining a side edge 16 or 18 of a respective utility blade 10 (FIG. 1). As may be recognized by those skilled in the pertinent art based on the teachings herein, the scoring instrument may take any of numerous configurations that are currently, or later become known for performing the function of scoring the composite strip as described herein. For example, a progressive die may be employed to punch the registration aperture 26 for each blade. Then, the same progressive die may either simultaneously or sequentially form the notches 24, 98 in the back and/or cutting edges of each blade and form the score lines 64. The term score line is used herein to mean a line defined by a recess or indentation in the surface of the composite strip. Such lines can be formed by any of numerous instruments or tools that are currently or later become known.

In accordance with a currently preferred embodiment of the present invention, the depth of score is preferably within the range of about 40% to about 50% of the thickness of the blade, and most preferably within the range of about 45% to about 48% of the thickness of the blade. In the illustrated embodiment, the blade is approximately 0.6 mm thick, and the depth of score is preferably within the range of about 0.27 mm to about 0.29 mm. With the current blade design and materials of construction, a depth of score greater than about 50% of the blade thickness has tended to cause the bi-metal strip to pull apart at the score lines upon passage through the furnace. Also in accordance with the currently preferred embodiment of the present invention, each score line is approximately v-shaped, and the included angle of each v-shaped score line is preferably within the range of about 50° to about 60°. In the illustrated embodiment of the present invention, the included angle of each score line is about 55°. The greater the included angle of the score line, the greater is the pressure on the back side of the blade upon scoring, and thus the greater is the likelihood that the scoring tool will create a ripple effect on the back side of the blade. The smaller the included angle, on the other hand, the more rapid will be the scoring tool wear during use.

The apparatus 56 further includes a punch 66 defining a plurality of cutting surfaces 68, each corresponding in shape and position to a respective notch 24 and aperture 26. As shown in FIG. 5, the punch 56 is drivingly connected to drive source 70, such as a hydraulic cylinder, and is movable into and out of engagement with the bi-metal strip seated on the work support surface 62 for cutting the notches 24 and aperture 26 in the bi-metal strip. As will be recognized by those of ordinary skill in the pertinent art based on the teachings herein, the scoring tool 58 and punch 66 may be computer-controlled to automatically drive the scoring tool and punch into and out of engagement with the bi-metal strip, and a driving mechanism (not shown) may be employed to automatically index the bi-metal strip relative to the scoring tool and punch. Similarly, the scoring tool and punch may be mounted in different apparatus or work stations than each other, and/or may each take the form of any of numerous other tools that are currently or later become known for either applying the score lines to the bi-metal strip, or cutting the notches and/or apertures in the bi-metal strip. For example, as described above, a progressive die may be employed to punch the registration apertures and notches and to form the score lines. In addition, as described further below, at step 118 of FIG. 3B, the high speed or tool steel cutting edges of the blades may be notched at the juncture of each score line and the cutting edge to facilitate separation of the blades from the composite strip and to shape the corners of the cutting edges of the blades.

As shown at step 120 of FIG. 3B, the punched and scored bi-metal strip 46 may be coiled again, if necessary, for either temporary storage or transportation to the hardening and tempering stations. At step 122, the bi-metal strip is then uncoiled, if necessary, and at step 124, the uncoiled strip is hardened and tempered. As may be recognized by those of ordinary skill in the pertinent art based on the teachings herein, the hardening and tempering operations may be performed in accordance with any of numerous different hardening and tempering processes and apparatus that are currently known, or later become known for hardening and tempering articles like the bi-metal strip 46. In the currently preferred embodiment of the present invention, the bi-metal strip 46 is hardened at a temperature within the range of approximately 2000° F. to approximately 2200° F. for a hardening time period within the range of about 3 to about 5 minutes. Then, after hardening, the bi-metal strip is tempered within a first tempering cycle at a temperature within the range of approximately 1000° F. to approximately 1200° F. for a tempering time within the range of about 3 to about 5 minutes. After the first tempering cycle, the bi-metal strip is quenched by air cooling to room temperature. In the currently preferred embodiment of the present invention, the hardening and tempering cycles are performed "in-line" such that the bi-metal strip is continuously driven first through an elongated hardening furnace, then through a first elongated tempering furnace, then through a quenching station, and then through at least one more tempering furnace and quenching station. However, as may be recognized by those of ordinary skill in the pertinent art based on the teachings herein, the bi-metal strip may be repeatedly passed through the same tempering furnace and quenching station(s), and/or may be wound into coils and hardened, tempered and quenched in a "pit-type" or other furnace. In addition, the quenching may be an air quench as described herein, or may be an oil quench or other type of quench that is currently, or later becomes known for quenching tempered articles of the type disclosed herein.

Similarly, the composite strip may be subjected to any number of tempering and quenching cycles as may be required in order to obtain the desired physical characteristics of the resulting blades.

At step 126, the tempered and quenched bi-metal strip 46 is coiled again, if necessary, for transportation to the next tempering station, and at step 128, the bi-metal strip is uncoiled for the second tempering cycle. As discussed above, these and other coiling and uncoiling steps can be eliminated by providing one or more in-line stations for processing the bi-metal strip. At step 130, the bi-metal strip is tempered again within a second tempering cycle at a temperature within the range of approximately 1000° F. to approximately 1200° F. for a tempering time within the range of about 3 to about 5 minutes. After the second tempering cycle, the bi-metal strip is quenched to room temperature. In the currently preferred embodiment, the quench is an air quench; however, as discussed above, this quench may take the form of any of numerous other types of quenching processes that are currently or later become known for articles of the type disclosed herein. Then, at step 132 the tempered and quenched bi-metal strip is coiled again either for temporary storage and/or transportation to the grinding, die cutting or bending and snapping stations.

At step 134, the annealed, hardened and tempered bi-metal strip 46 is uncoiled again, if necessary, and at 136, the bi-metal strip is subjected to grinding, honing, stropping, and die-cutting or bending and snapping steps. More specifically, the bi-metal strip 46 is ground, honed and stropped in a manner known to those of ordinary skill in the pertinent art to form the facets 30 and 32 of FIG. 2, and thereby define a straight, high-speed or tool steel cutting edge along the side of the composite strip opposite the back edge of the first metal portion. At this point, the ground, honed and stropped bi-metal strip 46 may be coated, such as by PVD coating the cutting edge and adjacent portions of the strip with a TiN or AlTiN coating, or with an inner coating of AlTiN and an outer coating of TiN, as described further below. Alternatively, the bi-metal strip may not be coated. The ground, honed and stropped bi-metal strip 46 (either coated or not coated) is then die cut, bent and snapped or otherwise separated along the score lines 64 of FIG. 5 to thereby form a plurality of utility blades from the composite strip. As described above, in one embodiment of the present invention, each utility blade defines an approximately trapezoidal peripheral configuration with the notches 24 and central aperture 26 formed therein, as shown typically in FIG. 1, or otherwise as described below.

Figure 6:
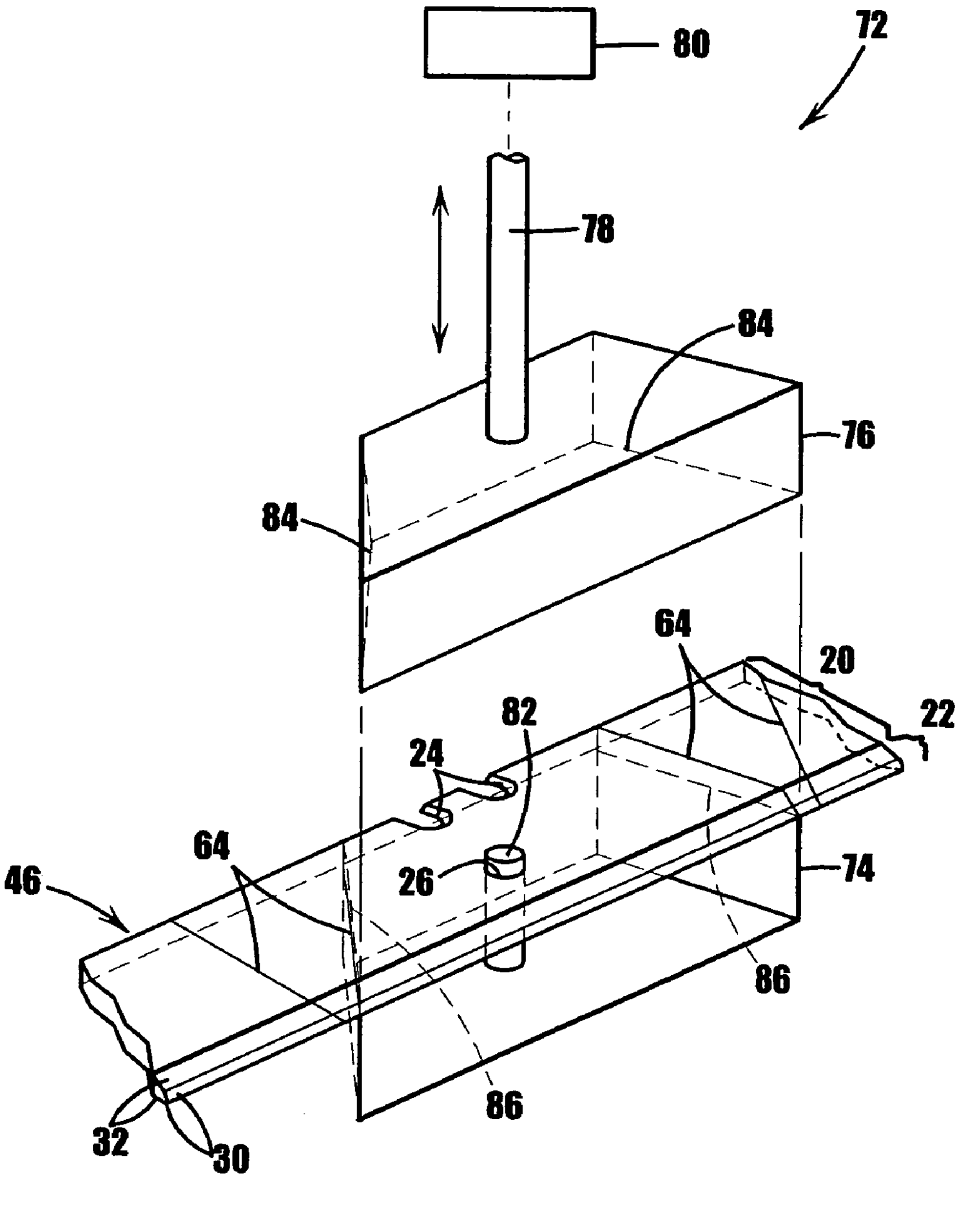
FIG. 6 is a somewhat schematic, perspective view of an apparatus for die cutting bi-metal strips in accordance with an embodiment of the present invention.

As shown in FIG. 6, a typical apparatus for die cutting the bi-metal strip is indicated generally by the reference numeral 72. The apparatus 72 comprises male and female dies 74 and 76, respectively, wherein the female die 76 is connected to a shaft 78 and the shaft is, in turn, drivingly connected to a hydraulic cylinder or like drive source 80 for moving the female die 78 into and out of engagement with the bi-metal strip 46 overlying the male die 74. The male die 74 includes a locator pin 82 projecting upwardly therefrom and received within the apertures 26 of the bi-metal strip to thereby properly locate the bimetal strip between the male and female dies. As shown in phantom in FIG. 6, the female die 76 includes blade-like edges 84, and the male die 74 includes opposing blade-like edges 86 overlying and underlying respectively the score lines 64 of the portion of the bi-metal strip 46 received between the dies. Then, in order to die cut the strip, the drive source 80 is actuated to drive the female die 76 downwardly and into engagement with the bi-metal strip such that the female and male blade-like edges 84 and 86, respectively, cooperate to shear the bi-metal strip along the score lines and thereby form a respective utility blade embodying the present invention, as shown typically in FIG. 1. During this die-cutting operation, because of the relative hardness of the first and second metal portions 20 and 22, respectively, of the bi-metal strip, the strip is sheared by the blade-like edges along the score lines 64 within the first metal portion 20, and is snapped by the blade-like edges along the portions of the score lines within the relatively hard and brittle second portion 22. Thus, the score lines provide desired break lines (or a desired “crack path”) within the relatively hard and brittle second metal portion, and therefore are important to providing clean and sharp edges in these regions of the blades.

In accordance with an alternative embodiment of the present invention, and as shown typically in FIG. 7, the bi-metal strip 46 may be punched prior to hardening at step 124 in order to avoid the need to later cut the relatively hard and brittle high speed steel edge at step 136, and thereby prevent any possible damage to the cutting edge 14 and facets 30 and 32 formed thereon that might otherwise occur during die-cutting. As shown typically in FIG. 7, an apparatus for punching the high-speed steel edge in accordance with one embodiment of the present invention is indicated generally by the reference numeral 88. The apparatus 88 includes a punch or like tool 90 mounted on a tool support 92 over a work support surface 94 for supporting the bi-metal strip 46 thereon. The tool support 92 is drivingly connected to a hydraulic cylinder or like drive source 96 for driving the punch 90 into and out of engagement with the high speed steel edge 14 of the bi-metal strip 46. As shown typically in FIG. 7, the punch 90 is shaped and configured to form a notch 98 at the interface of each score line 64 and the high speed steel edge or second metal portion 22. Thus, as shown typically in FIG. 7, each notch 98 may extend along the respective score line throughout the second metal portion 22 of the score line to thereby separate the high speed steel portion of the respective blade from the remainder of the bi-metal strip at the score lines. Alternatively, as described further below, each score line may extend along only a portion of the lateral extent of the second metal portion to facilitate cleanly separating the blades from the composite strip and/or to shape the corners of the cutting edges. Then, when the bi-metal strip 46 is die cut as shown in FIG. 6, or bent and snapped as described below, the equipment need only cut or snap the first metal portion 20 of the strip along the score lines and need not cut or snap the high speed steel edge portions removed by the notching operation. As described above, the first metal portion 20 is relatively pliable and significantly less hard than the second metal portion 22, and therefore the first metal portion 20 may be easily and cleanly die cut, bent and snapped, or otherwise separated along the score lines 64. After hardening, the second metal portion 22 may be relatively difficult to die cut because of the relative hardness and brittleness of this portion. However, prior to hardening, the high speed steel edge exhibits a surface hardness within the range of about 25 Rc, and therefore may be relatively easily and cleanly cut at this stage of the process. Accordingly, the alternative process and construction of FIG. 7 may facilitate the ability to avoid any damage to the hardened, high speed steel edge, that might otherwise occur when die cutting such edge.

Figure 7:
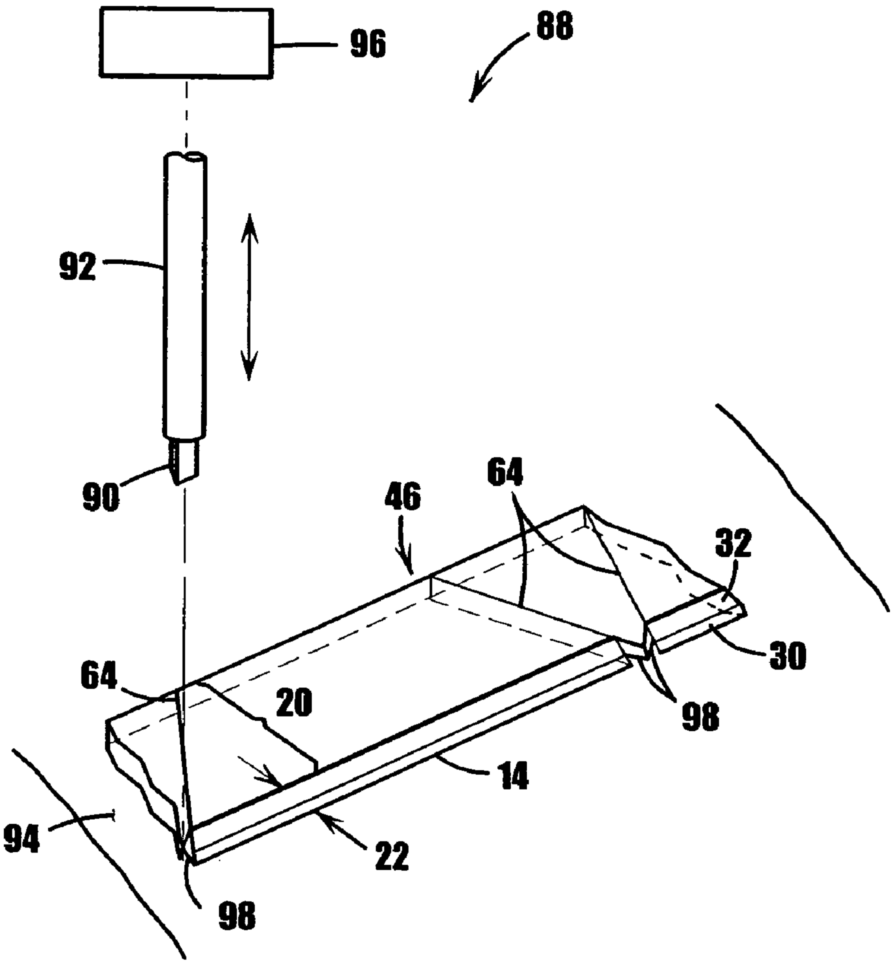
FIG. 7 is a somewhat schematic, perspective view of an apparatus for punching notches in the high-speed or tool steel edges of the bi-metal strips prior to hardening the strips in accordance with an embodiment of the present invention, and the resulting notched strip.

The notches 98 of FIG. 7 are shown as v-shaped notches. However, as may be recognized by those of ordinary skill in the pertinent art based on the teachings herein, these notches or cut outs may take any of numerous different shapes that may be required to separate the high speed steel edge portions of each blade from the remainder of the composite strip at the score lines. Similarly, as described further below, the notches may be formed to shape the corners of the cutting edges to be squared, oblique, or any other desired shape. As may be further recognized by those skilled in the pertinent art based on the teachings herein, it may be possible in the alternative embodiment of the present invention to eliminate the score lines because the score lines may be unnecessary in certain circumstances for purposes of die cutting the first metal portion 20 of the bi-metal strip.

Turning again to FIG. 3B, at step 138 the blades are stacked, and at step 140, the stacked blades are packaged in a manner known to those of ordinary skill in the pertinent art.

Figure 8:
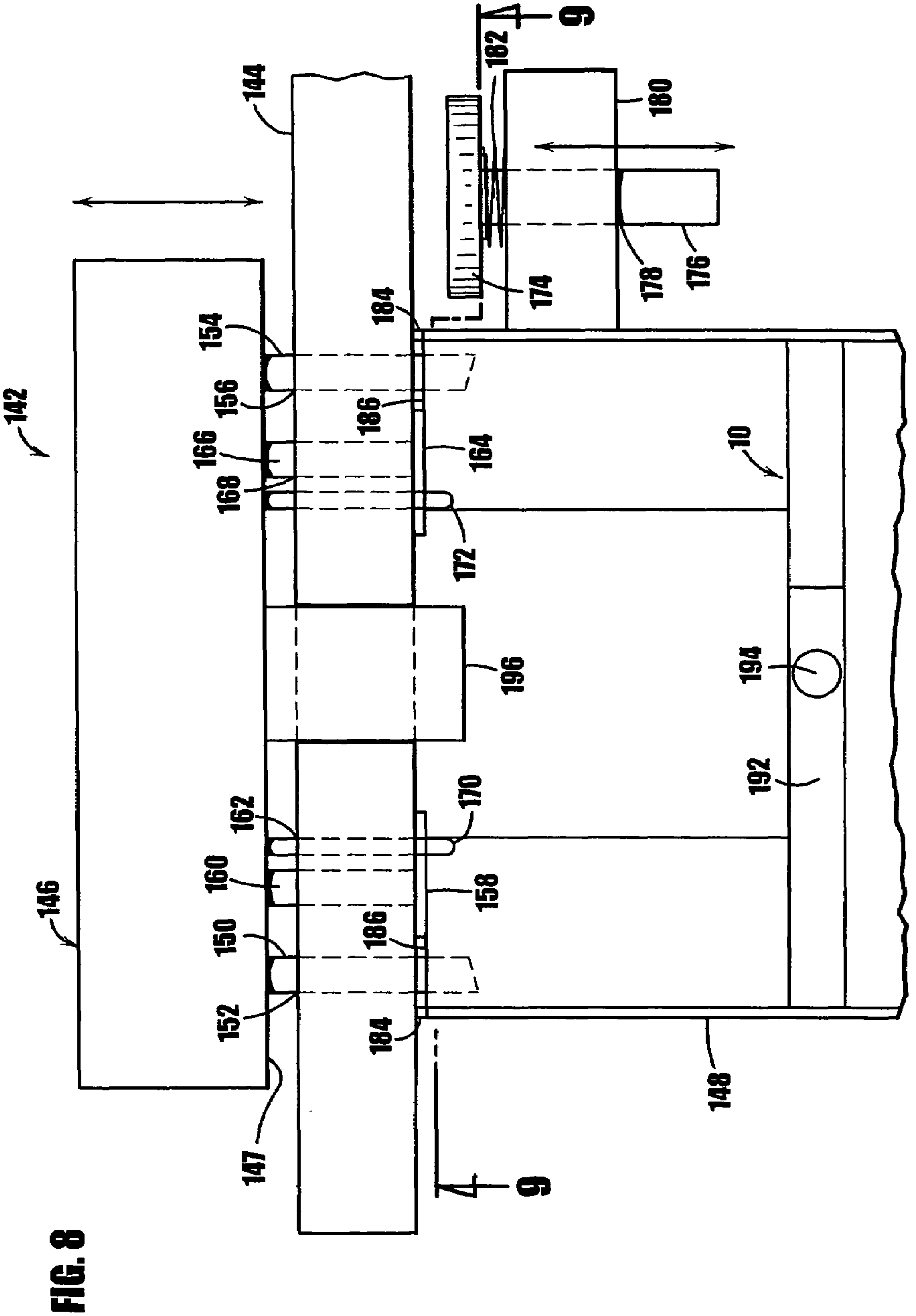
FIG. 8 is a somewhat schematic, top plan view of an apparatus for bending and snapping the composite strips in order to make the composite utility blades in accordance with another embodiment of the invention.
Figure 9:
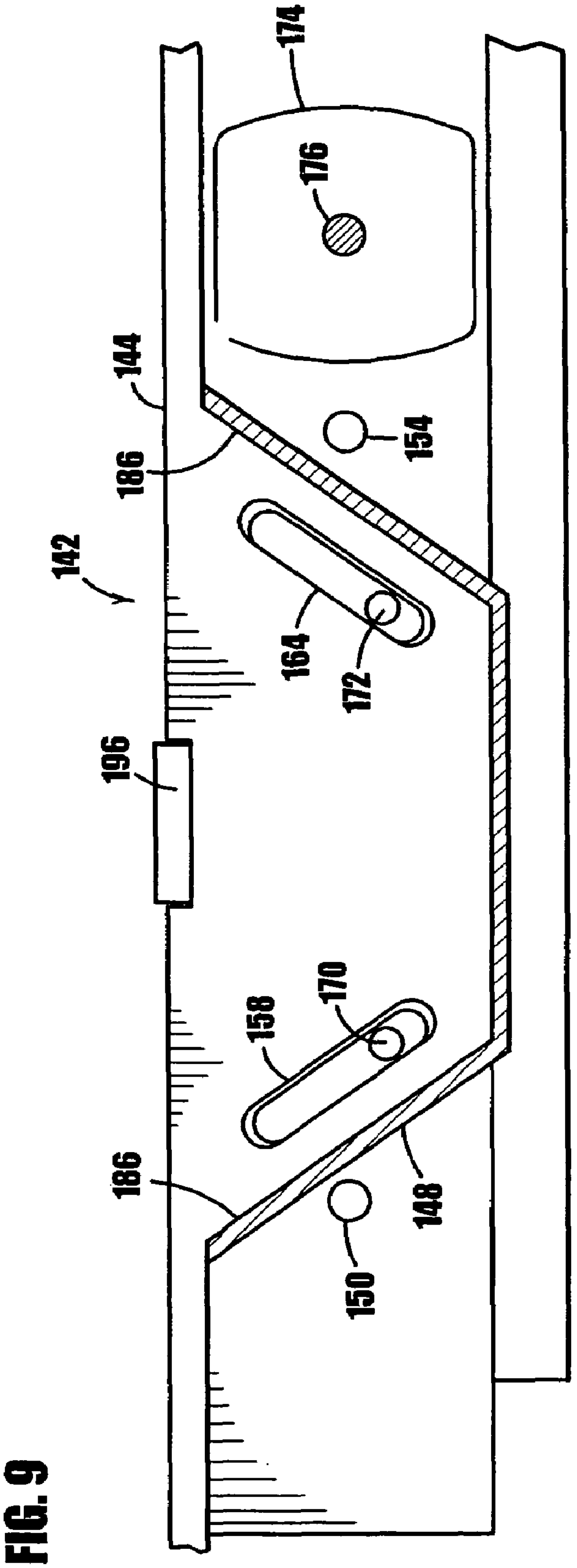
FIG. 9 is a partial cross-sectional view of the bending and snapping apparatus taken along line 9-9 of FIG. 8.

Turning to FIGS. 8 and 9, an apparatus for bending and snapping the composite strips 46 in order to form the utility blades 10 is indicated generally by the reference numeral 142. The apparatus 142 includes a blade support 144, a drive assembly 146 mounted on one side of the blade support, and a blade magazine 148 mounted on the opposite side of the blade support relative to the drive assembly 146. The drive assembly 146 includes a drive plate 147 mounted on linear bearings (not shown) and drivingly connected to a suitable drive source, such as a hydraulic or pneumatic cylinder (not shown), for moving the drive plate toward and away from the blade support 144 as indicated by the arrows in FIG. 8. The drive assembly 146 further includes a first bending pin 150 slidably received through a first pin aperture 152 extending through the blade support 144; a second bending pin 154 slidably received through a second pin aperture 156 extending through the blade support; a first breaking punch 158 including a support shaft 160 slidably received through a first punch aperture 162 extending through the blade support; and a second breaking punch 164 including a support shaft 166 slidably received through a second punch aperture 168. The first breaking punch 158 includes a first blade release pin 170, and the second breaking punch 164 includes a second blade release pin 172. As described further below, each blade release pin 170 and 172 is spring loaded in the direction out of the page in FIG. 9. Accordingly, upon bending and snapping each blade 10 from the composite strip 46, the spring loaded pins 170 and 172 drive the respective blade 10 into the blade magazine 148. The apparatus 142 further includes a spring-loaded presser plate 174 for pressing the composite strip 46 against the blade support 144. The presser plate 174 is mounted on a shaft 176 slidably received through an aperture 178 formed in a support block 180 for movement toward and away from the blade support, as indicated by the arrows in FIG. 8. A coil spring 182 or like biasing member is coupled to the presser plate 174 and support shaft 176 to normally bias the presser plate toward the blade support. As shown in FIG. 8, the blade magazine 148 is spaced away from the blade support 144 to thereby define a blade gap 184 therebetween. The composite strip 46 is fed through the blade gap 184 in the direction from the right-hand to the left-hand side in each of FIGS. 8 and 9. The surface 186 of the blade magazine 148 facing the blade support 144 defines a rule or die against which the composite strip is pressed for performing the bending and snapping operation.

Figure 10:
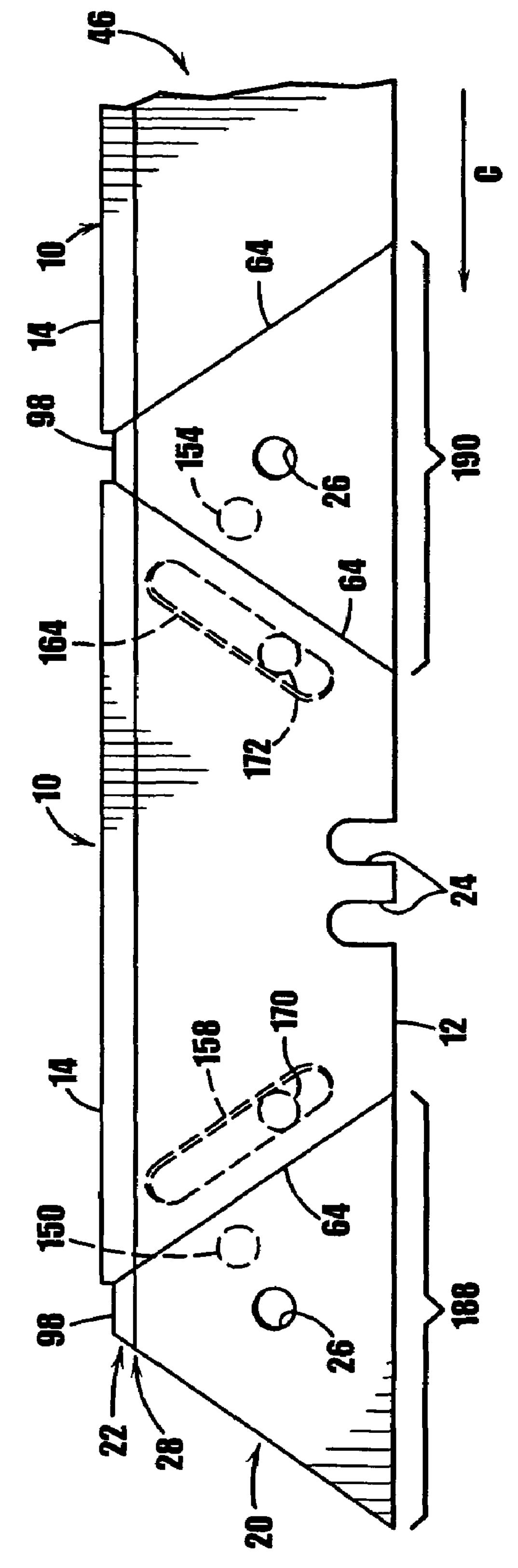
FIG. 10 is a side elevational view of a composite bi-metal strip that further illustrates in broken lines the bending pins and breaking punches of the bending and snapping apparatus of FIGS. 8 and 9 that operate on the composite strip to form the composite utility blades of the present invention.

In FIG. 10, the composite strip 46 that is bent and snapped in the apparatus 142 includes registration apertures 26 formed in the scrap portion of the strip, i.e., between the score lines 64 of adjacent blades 10. In addition, the composite strip 46 includes a plurality of notches 98 formed in the second metal portion 22 at the juncture of each score line 64 and the second metal portion. As can be seen in FIG. 10, each notch 98 extends laterally into the second metal portion 22 about halfway across the width of the second metal portion. In addition, the end surfaces of each notch in the axial direction of the composite strip are each oriented approximately normal to the cutting edge (i.e., each notch is approximately rectangular). In this manner, when the composite strip is bent and snapped and the blades are separated therefrom as described further below, the corners of each cutting edge 14 are squared. The depth of each notch 98 (i.e., the lateral dimension on the composite strip) is sufficient to remove from the strip the respective portion of the cutting edge 14 that does not define a score line 64, and that contains any portion of the respective score line that is too shallow due to the sloped configuration of the facets 30, 32 to effectively bend and snap the blade from the strip and thereby define a clean corner (i.e., a straight edge or otherwise an edge defined by a clean break along the respective score line). Accordingly, a significant advantage of the notches 98 is that they facilitate forming a clean break at the corners of the cutting blades. In addition, by shaping the corners of the cutting edge to define a squared edge, a rounded edge, an oblique edge, or other desired shape, the corners of the blade can be made significantly more robust in comparison to pointed corners, and thus less susceptible to chipping and/or breaking in comparison to pointed corners. As may be recognized by those skilled in the pertinent art based on the teachings herein, the notches may take any of numerous different shapes, configurations and/or sizes that may be desired to facilitate the manufacture and/or to enhance performance of the blades, or otherwise as desired. As described above, the notches 98 are preferably formed at step 118 of FIG. 3B in a progressive die or other suitable tool or equipment.

In the operation of the bending and snapping apparatus 142, the composite strip 46 is fed through the blade gap 184 of the apparatus in the direction of the arrow C of FIG. 10, i.e., from the right-hand to the left-hand side in each of FIGS. 8-10. First, the composite strip 46 is secured in place by a locating pin (not shown) received within a respective registration aperture 26. Then, the drive assembly 142 is driven toward the blade support 144, and the first and second bending pins, 150 and 154, respectively, and the first and second breaking punches 158 and 164, respectively, are configured to successively bend and break the composite strip about each score line as hereinafter described. Initially, the first bending pin 150 is driven by the drive assembly 142 against the strip to bend the first triangle 188 of FIG. 10 about the respective score line 64, i.e., in the direction out of the page in FIG. 10. As can be seen, the portions of the composite strip 46 defining the respective score lines 64 are driven against the die 186 to thereby bend the respective triangle about the die and score line, and away from the blade support 144. While the first bending pin 150 is bending the first triangle 188 outwardly, the first breaking punch 158 is pressed against the blade to simultaneously apply pressure to the composite strip 46 on the opposite side of the respective score line 64 relative to the first bending pin 150. Next, the second bending pin 154 is driven against the composite strip 46 at the second triangle 190 of FIG. 10 to, in turn, bend the second triangle outwardly around the respective score line, i.e., out of the page in FIG. 10. While the second bending pin 154 is bending the second triangle 190 outwardly, the second breaking punch 164 is pressed against the composite strip to simultaneously apply pressure to the composite strip on the opposite side of the respective score line 64 relative to the second bending pin 154. The first breaking punch 158 then snaps the composite strip at the respective score line 64 and the first triangle 188 falls downwardly away from the blade. Then, the second breaking punch 164 snaps the composite strip at the respective score line 64, and the spring-loaded pins 170 and 172 drive the resulting blade 10 outwardly into the blade magazine 148. The drive assembly 142 is then driven rearwardly, i.e., away from the blade support 144, the spring loaded presser plate 174 presses and, in turn, bends the second triangle 190 of the composite strip inwardly against the blade support 144 to thereby straighten the respective portion of the strip and allow its subsequent passage through the blade gap 184, and the composite strip 46 is indexed forwardly through the blade gap to present the next blade section of the composite strip for bending and snapping in the manner described above. This process is repeated for each blade section until all blades 10 are bent and snapped away from the composite strip 46. As may be recognized by those of ordinary skill in the pertinent art based on the teachings herein, the bending pins and breaking punches may take any of numerous different shapes and/or configurations that are currently, or later become known for performing the functions of these components as described herein. For example, as shown in phantom in FIG. 8, the ends of the bending pins may be defined by angled surfaces to facilitate the bending operation. Similarly, the breaking punches may define angled or other surfaces to facilitate pressing and snapping the blades without damaging them.

As shown in FIG. 8, the blade magazine 148 includes an adjustable blade support 192 that is slidably mounted within the magazine, and the support 192 includes an adjustment knob 194 for fixedly securing the position of the blade support within the magazine. As the blades 10 are bent and snapped away from the composite strip 46, they are stacked by the spring-loaded pins 170 and 172 against the blade support 192. The drive assembly 142 further includes a blade guard 196 overlying the bending and snapping region of the apparatus 142 to prevent upward movement of the blades and retain them within the magazine.

Turning to FIGS. 12A-12F, additional embodiments of a composite strip of the present invention are indicated generally by the reference number 246. The composite strips 246 are similar to the composite strips 46 described above, and therefore like reference numerals preceded by the numeral "2" are used to indicate like elements where possible. One of the differences of the composite strips 246 in comparison to the composite strips 46 described above, is that the composite strips 246 are formed with elongated wear-resistant steel wires 244 that define predetermined cross-sectional shapes that substantially correspond to the final or ultimate shape of the second metal portion of the blade (e.g., the second metal portion 22 of the blade of FIG. 1). For example, in FIG. 12A, the high speed or tool steel wire 244 is substantially triangle-shaped in cross-section; in FIG. 12D, the wire 244 is substantially trapezoidal-shaped in cross-section; in FIG. 12E, the wire 244 is substantially triangle-shaped in cross-section, and is multi-faceted, defining a first pair of facets 230 and a second pair of facets 232; and in FIG. 12F, the wire 244 also is substantially triangle-shaped in cross-section.

In each case, the cross-sectional shape of the wire 244 more closely corresponds to the cross-sectional shape of the second metal portion of the blades to be formed from the composite strip than does a square cross-sectional shaped wire, for example. Preferably, the cross-sectional shape of the wire 244 substantially matches the cross-sectional shape of the second metal portion of the blade. For example, if the cross-sectional shape of the second metal portion is triangular, than the cross-sectional shape of the elongated wire is preferably also triangular. However, manufacturing limitations and/or other considerations may require that the cross-sectional shape of the wire not match the cross-sectional shape of the second metal portion of the blade. For example, although the second metal portion of the blade may define a triangular cross-sectional shape, the pre-shaped wire may define a trapezoidal cross-sectional shape as shown, for example, in FIG. 12D. The trapezoidal configuration may be tougher and otherwise may better prevent breakage of the high speed or tool steel portion during processing of the bi-metal strip, while nevertheless saving material and reducing processing time and expense in comparison to bi-metal blades without pre-shaped portions.

Accordingly, one advantage of pre-shaping the tool steel wire prior to forming the composite strip is that it reduces the amount of scrap generated during grinding and honing of the strip, and thus may enable a significant reduction in the amount of high speed or tool steel required to form the blades and, in turn, enable a decrease in the overall cost of the blades in comparison to blades formed from composite strips having, for example, round and/or square tool steel wires. For example, a conventional rectangular shaped high speed or tool steel wire, as described above, may define a width of about 0.04 inch and a height of about 0.025 inch. Thus, pre-shaping the wire in a triangular cross-sectional shape may reduce by about one half the amount of relatively expensive high speed or tool steel required to form the cutting edges of the blade in comparison to the same sized blades that employ rectangular wires. Although the trapezoidal shaped wires do not reduce by half the amount of high speed or tool steel in comparison to similarly sized rectangular wires, they nevertheless can significantly reduce the amount of high speed or tool steel required, and further, can reduce the amount of grinding required in comparison to blades that employ similarly sized rectangular wires. Accordingly, another advantage of employing pre-shaped wires is that they can significantly reduce the amount of grinding required and, in turn, increase the throughput of the manufacturing process, thus further enabling a decrease in overall cost of the blades.

Figure 12A:
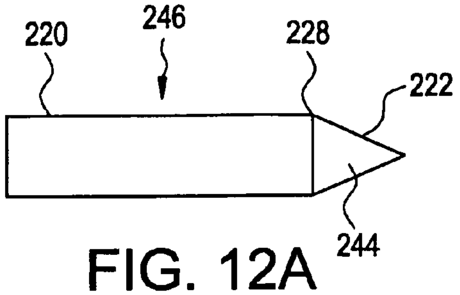
FIGS. 12A and 12D-12F are cross-sectional views of additional embodiments of the composite strip of the present invention formed by welding pre-shaped high speed steel wires to the spring steel backings.
Figure 12D:
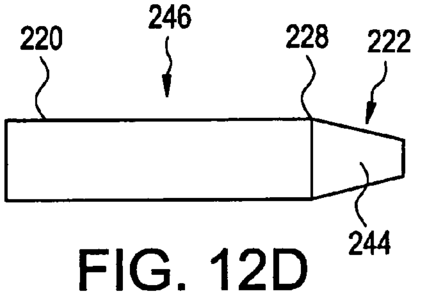
Figure 12E:
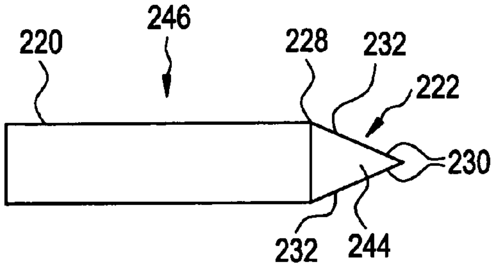
Figure 12F:
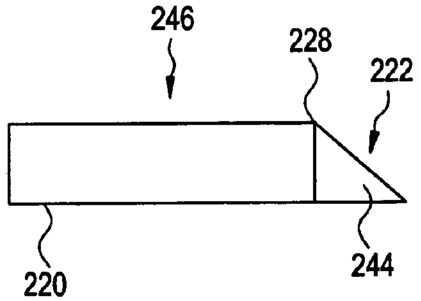
Figure 12B:
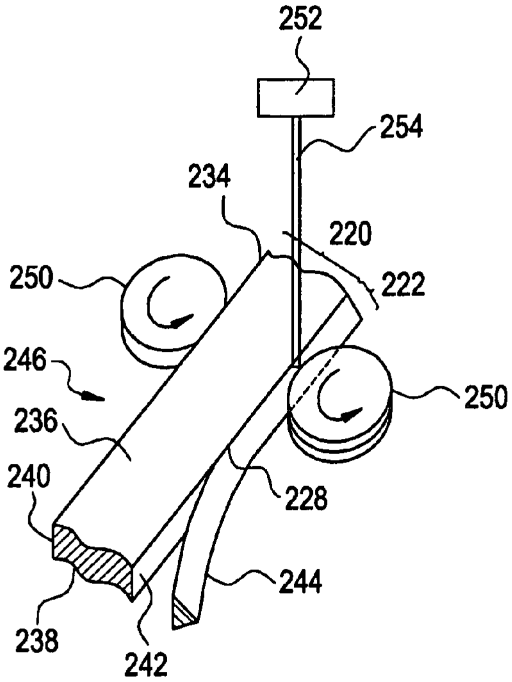
FIG. 12B is a somewhat schematic, perspective view of the apparatus for welding the pre-shaped high speed steel wire to the spring steel backing of the composite strip of FIG. 12A.
Figure 12C:
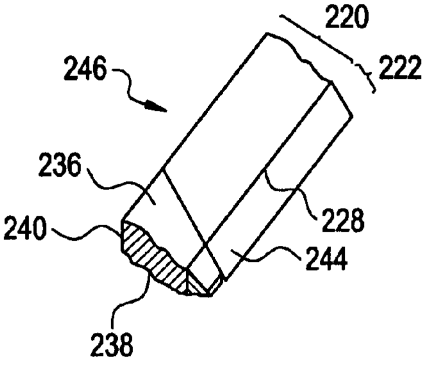
FIG. 12C is a partial, perspective view of the composite strip of FIG. 12A.

As shown in FIG. 12B, the backing steel is preferably provided in the form of one or more continuous elongated strips 234 wound into one or more coils. Each backing strip 234 defines an approximately planar upper side 236, an approximately planar lower side 238, and opposing back and front edges 240 and 242, respectively. The high speed steel wire 244, on the other hand, may take the shape of any of numerous different pre-shaped forms as indicated, for example, in FIGS. 12A-12F, and is preferably provided in the form of one or more continuous lengths of wire 244 wound into one or more coils.

The wire 244 may be provided in round form. In this case, it may be necessary to draw the round stock through a drawing die or series of drawing dies in a manner known to those of ordinary skill in the pertinent art in order to reduce the diameter to that necessary or otherwise desired for further processing. Then, the drawn round wire is shaped into the desired predetermined shape that substantially corresponds to the shape of the second metal portion of the blade, as shown, for example, in FIGS. 12A-12F, by any of numerous different wire shaping processes that are currently or later become known for performing this process. For example, the wire may be formed into the predetermined shape by one or more of: (a) rolling the wire; (b) passing the wire through a Turks Head; and (c) passing the wire through a draw die. Depending upon the width-to-thickness ratio of the desired predetermined wire shape, it may be desirable to employ a combination of these processes. For example, a Turks Head operation may be used to create a square wire, whereas a combination of rolling and Turks Head operations may be used to create rectangular, trapezoidal or triangular pre-shaped wires. Exemplary wire shaping apparatus include Turks Head and wire shaping mills, such as the combination Turks Head/ Rolling Mills, or other wire flattening and shaping mills, such as those manufactured by Fenn Manufacturing of Newington, Conn. U.S.A., or other profiling rolling machines, such as those manufactured by Karl Fuhr GmbH & Co. KG of Germany. The Turks Head is believed to facilitate the formation of relatively sharp corners that, in turn, allow the wire to intimately contact the corresponding surface of the backing strip throughout the interface between the two components to thereby ensure the integrity of the weld.

As shown in FIG. 12B, the high speed or tool steel wire 244 is butt joined to the front edge 242 of the backing strip 234, and thermal energy is applied to the interface between the wire and the backing strip to, in turn, weld the wire to the backing strip and form a bimetal or composite strip 246 defining the first metal portion 220 formed by the steel backing strip 234, the second metal portion 222 formed by the high speed steel wire 244, and the weld region 228 joining the first and second metal portions. As shown in FIG. 12B, a typical welding apparatus includes opposing rollers 250 laterally spaced relative to each other for butt joining the high speed steel wire 244 to the front edge 242 of the backing strip 234, and rotatably driving the composite or bi-metal strip 246 through the welding apparatus. A thermal energy source 252 is mounted within the welding apparatus and applies thermal energy to the interface of the high speed steel wire 244 and front edge 242 of the backing strip to weld the wire to the backing strip.

The composite strip 246 is then processed in the same manner as any of the composite strips described above in order to form therefrom the composite utility blades. As indicated above, a significant advantage of the composite strip 246 is that it may use less high speed steel and/or increase the manufacturing throughput than otherwise might be achieved without pre-shaping the wire.

Figure 11A:
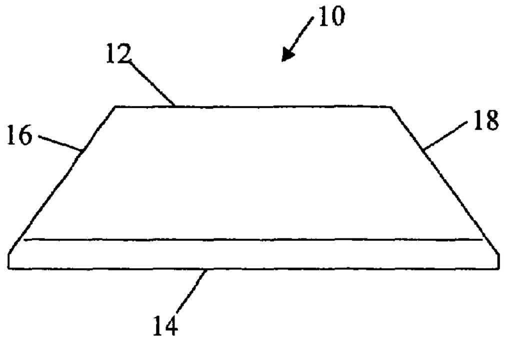
FIGS. 11A-11D are top plan views of the composite utility blade of the present invention illustrating exemplary shapes and configurations that the utility blade may take.
Figure 11B:
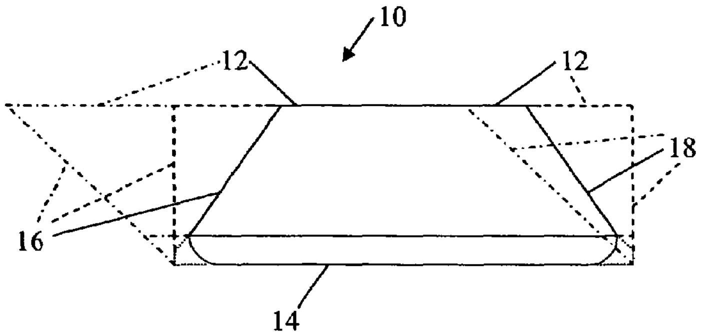
Figure 11C:
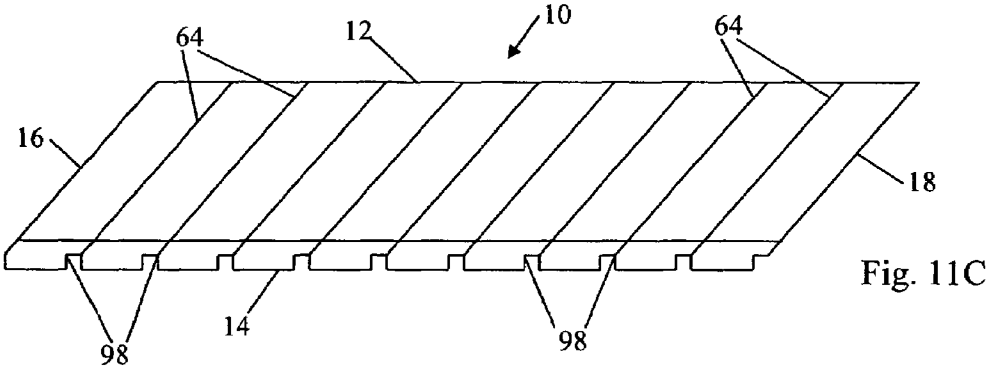
Figure 11D:
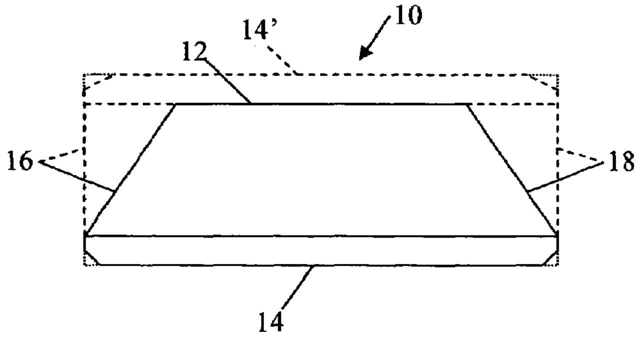

Turning to FIGS. 11A-11D, the blade 10 may take any of numerous different shapes and/or configurations. As shown in FIG. 11A, the cutting edge 14 of the trapezoidal blade 10 may define squared corners formed by the notches 98 described above with reference to FIG. 10. In FIG. 11B, the cutting edge 14 of the blade may define rounded corners by forming correspondingly shaped notches 98 in the composite strip 46. Alternatively, as shown in dashed lines in FIG. 11B, the blade 10 may define a rectangular shape, or as shown in the dashed-dotted lines, the blade may define a parallelogram. In FIG. 11C, the blade 10 defines a plurality of parallelogram-shaped segments separated by score lines 64 and respective notches 98. The notches 98 extend laterally into each second metal portion in the same manner as the notches 98 described above with reference to FIG. 10. The blade 10 of FIG. 11C is designed for use in a "snap-off" blade holder of a type known to those of ordinary skill in the pertinent art whereby each parallelogram-shaped segment (or other shaped segment, if desired) may be snapped off when the respective cutting edge segment 14 becomes worn to, in turn, expose a fresh cutting edge segment. Similarly, although the composite utility blades 10 described above define a bi-metal construction, the blades of the present invention may equally define a tri-metal or other composite construction. For example, as shown in FIG. 11D, the utility blades of the present invention may define high speed or tool steel cutting edges 14, 14' (the second cutting edge 14' being shown in broken lines) formed on opposite sides of the blade relative to each other, with a relatively tough, spring-like portion formed between the outer high speed steel edges. Similarly, a tri-metal strip may be cut down the middle, or otherwise cut along an axially-extending line to form two bi-metal strips which each may, in turn, be cut to form the blades of the present invention. As also shown in FIG. 11D, the corners of the cutting edges 14, 14' may be formed by lateral surfaces oriented at oblique angles relative to the cutting edge.

In addition, many, if not all, of the coiling and uncoiling steps shown in FIGS. 3A and 3B may be eliminated by employing in-line processing apparatus. Also, the blades first may be blanked from the composite strip, such as by die-cutting or bending and snapping, and then the heat treating, grinding and other finishing steps may be performed on the blanked blades to form the final utility blades.

In some embodiments, a blade in accordance with any of the embodiments described hereinabove, is provided with one or more coatings. Such coating(s) may be provided for one or more of a number of reasons. For example, some types of coatings are purely decorative (i.e., non-functional or cosmetic). Some other types of coatings are purely functional (e.g., wear and/or corrosion resistance). Some other types of coatings may have decorative and functional aspects. Moreover, one or more coating(s) may be provided on top of one or more other coating(s). For example, in some embodiments, a functional coating is provided over a blade (or portion(s) thereof) and a decorative coating is provided over the functional coating (or portion(s) thereof). A coating may be provided over an entire blade or any portion thereof (e.g., the cutting edge 14 or portion(s) thereof).

As used herein, except where otherwise stated, the phrases "decorative" coating and "cosmetic" coating, mean at least primarily "decorative" and at least primarily "cosmetic", respectively, so as not to preclude the possibility that a decorative coating or a cosmetic coating, respectively, provide some amount of wear and/or corrosion resistance (or some other non-decorative or non cosmetic property). For example, decorative coatings may provide some measure of wear and/or corrosion resistance. However, the amount of wear and/or corrosion resistance (or other property) provided by a decorative or cosmetic coating will generally be small compared to that of a purely functional coating of similar thickness and suitable composition.

Some examples of different types of coatings include carbide coatings, nitride coatings, and combinations thereof. Coatings intended to reduce the rate of wear of the blade may comprise, for example, any suitable material(s) including but not limited to titanium nitride (TiN), chrome nitride (CrN), titanium carbide (TiC), ceramic(s), titanium carbonitride (TiCN), Aluminum Titanium Nitride (AlTiN), Aluminum Titanium Carbonitride (AlTiCN), Zirconium Nitride (ZrN), Zirconium Carbonitride (ZrCN), and/or combinations thereof.

Some types of decorative coatings are used to make a blade (or portion(s) thereof, e.g., the cutting edge 14, or portion(s) thereof) having a colored appearance, e.g., gold, or any of numerous other colors. Some of such decorative coatings are comprised of titanium nitride (TiN). In some embodiments, a decorative coating is applied only to one or more of the first facets 30 (or portion(s) thereof), thereby defining colored strip(s) over the cutting edge 14.

Some methods for use in providing functional (e.g., wear or abrasion resistant coatings) on a blade include the step of heating the base material (e.g., carbon steel). Although such heating may cause a reduction in the hardness of the base material it also increases the ability of the base material to support the coating, which helps the coating hold up better against heat generated during cutting operations. For a base material formed of carbon steel, the temperature may be, but is not limited to, a temperature in the range of about 300° F. to about 400° F. For high speed steel, the temperature may be, but is not limited to, a temperature of about 1000° F. In some embodiments, the temperature may be greater than about 1000° F. One advantage of the bi-metal blades of the currently preferred embodiments of the present invention is that the high speed steels used to form the cutting edges can be heated to temperatures on the order at least about 1000° F. without damage thereto, and therefore such blades are uniquely suited for coatings that require high temperatures or that permit operation under high temperatures, such as AlTiN or other PVD coatings. Accordingly, if relatively high temperatures are generated at the cutting edges of the AlTiN coated blades of the present invention, the coating can better withstand the heat in comparison to prior art blades. If some conventional carbon steels, on the other hand, are heated to temperatures above between about 300° F. and about 400° F., the steel can lose its hardness and strength and, in turn, lose its ability to properly support some such coatings.

In at least some embodiments, one or more coating(s) are provided using physical vapor deposition (PVD). Physical vapor deposition may be carried out in any suitable manner including but not limited to using cathodic arc deposition, thermal/electron beam deposition, and/or sputter deposition. However coatings also may be provided by other methods. Indeed, coatings may be provided using any suitable manner including but not limited to painting, spraying, brushing, dipping, plating (electroplating or electro-less plating), physical and/or chemical vapor deposition, or any combination thereof. Powder coatings and e-coatings, and/or combinations of any of the above, also may be employed.

In accordance with currently preferred embodiments of the present invention, the utility blades are coated with either TiN or AlTiN, or with an inner layer of AlTiN and an outer layer of TiN for a gold-colored appearance. The coatings extend along the cutting edge, and along the sides of the blade adjacent to the cutting edge. The AlTiN coatings are applied to the pre-sharpened blades in a thickness within the range of about 3 micrometers to about 5 micrometers. In the embodiment employing an inner coating of AlTiN and out outer coating of TiN, the outer coater is thinner than the inner coating. Also in a currently preferred embodiment of the present invention, the AlTiN coating is applied so as to provide a gradient (linear or otherwise) such that the concentration of aluminum increases from about 32% (atomic percent) at the substrate surface to about 66% at the outer surface of the coating. One advantage of this configuration is that the higher concentration of titanium at the substrate/coating interface facilitates adhesion of the coating to the substrate.

The AlTiN and TiN coatings are applied to the blades in a commercially available cathodic arc deposition system, in which the coiled bi-metal strips (or separated blades if so desired) are processed through a multistage cleaning system to remove the bulk of surface contaminant soils. The PVD coating chamber is of a conventional type including gas lines for oxygen, nitrogen, argon, and methane/acetylene; a vacuum pump system coupled in fluid communication with the chamber for evacuating the chamber; a plurality of targets spaced relative to each other about the chamber; a water circulating unit that circulates hot and cold water via a closed loop system to the chamber; and a plurality of evaporators and evaporator power supplies.

Each bi-metal strip is preferably wound into a coil with a buffer strip interposed between the windings of the bi-metal strip. The buffer strip may be formed, for example, of stainless steel, and may define a plurality of axially spaced dimples projecting laterally therefrom to define a pre-determined spacing between adjacent windings of the bi-metal coil. The width of the buffer strip is preferably less than the width of the bi-metal strip. Thus, when the strips are wound together into a coil, the back edges of the strips are preferably aligned such that the cutting edge of the bi-metal strip extends beyond the corresponding edge of the buffer strip. The exposed portions of the bi-metal strip will be exposed to the targets, and thus will be coated with the AlTiN, TiN, AlTiN/TiN, or other PVD coating. Thus, the extent to which the bi-metal strip extends beyond the corresponding edge of the buffer strip defines the depth of coating on the bi-metal strip (or the width of the coating on opposing sides of the cutting edge).

A plurality of such coils are mounted on cross-shaped or other suitable fixtures for holding the coils in the coating chamber and allowing relative movement between the coils and targets for coating the cutting edges of the bi-metal strips. The exposed edges or cutting edges of the bi-metal coiled strips are preferably oriented in planes approximately parallel to the planes of the targets (i.e., the cutting edges are mounted to face the targets and to receive a substantially uniform PVD coating therefrom). The cross-shaped or other suitable fixtures for holding the coils are mounted on a planetary fixture that is received within the coating chamber and rotatably driven therein. The cross-shaped fixtures and coils mounted thereon are mounted on the planetary fixture such that they are axially and angularly spaced relative to each other. In one embodiment, the planetary fixture can hold about 8 coils, with a first set of four coils angularly spaced about 90° relative to each other, and a second set of four coils angularly spaced about 90° relative to each other and axially spaced relative to the first set of four coils. If desired, the two sets of coils can be angularly offset about 90° or otherwise relative to each other.

Once the coils are mounted within the coating chamber, the chamber is pumped down to insure a pure processing environment consisting of only the cleaned bi-metal strips to be coated and the solid material to be vaporized. Then, after the extremely low pressure or high vacuum pure environment is created, the coiled bi-metal strips are gently heated. Heating ensures out gassing of the bi-metal substrates and raises the core and surface temperatures of the bi-metal substrates to better match the thermodynamics of the coating cycle. One embodiment of the system uses PID controlled heaters to coat at a temperature within the range of about 100°-120° F. for a time period within the range of about 0-150 minutes.

The apparatus then performs etching by employing a combination of sputter etches at a high bias voltage and arc assisted argon etches at a high bias voltage (the apparatus may transition from sputter etch to arc assisted glow discharge etch in steps). Etch depth is controlled in a manner known to those of ordinary skill in the pertinent art. The sputter etch is a Ti ion bombard etch where the surface is heated up and conditioned by ramping the voltage in discrete steps as a precursor to an arc enhanced glow discharge. The arc enhanced glow discharge uses a Mod pulsar system for substrate conditioning. The shutter closes on the Ti/Cr targets and there is a generation of a glow (plasma) using bias voltage that gradually raises from 0 to about 400 V in steps with two targets running from 0 to about 85 V.

The next phase consists of Argon gas plasma cleaning (etching) of the substrates inside the vacuum chamber. The Argon back sputter ion cleaning is effective in atomically preparing the surface of the substrates by removing oxide layers and exposing native surfaces. One advantage of this feature is that it facilitates adhering the coating to the substrate and not to any oxides or other contaminants that otherwise could be located on the surface of the substrate.

The reactive coating process is performed at about 0-500 V bias and by turning on the evaporators from about 0-85 amps on the targets. Process gases are bled into the chamber and the coating material is vaporized and condensed or deposited on the exposed cutting edges and adjacent surfaces of the wound bi-metal substrates. The desired coating thickness is reached by allowing the vaporization to continue for a predetermined amount of time. Coating times may vary from about 30 minutes to about four hours. As described above, in currently preferred embodiments of the present invention, the coatings consist of either TiN or AlTiN, or an inner coating of AlTiN with an outer coating of TiN to achieve a gold-colored appearance. In a currently preferred embodiment of the present invention, the AlTiN coating is applied in a thickness within the range of about 3 micrometers to about 5 micrometers. In the embodiment including an inner AlTiN coating, and an outer TiN coating, the outer TiN coating is thinner than the inner AlTiN coating. The coating(s) preferably are applied in stripes or like narrow bands extending along opposite sides of the cutting edge relative to each other. In the currently preferred embodiments of the present invention, the width of each stripe is preferably within the range of about 0.005 inch through about 0.025 inch (for blades having a width of about 0.75 inch and a thickness of about 0.025 each). In one currently preferred embodiment of the present invention, the width of the stripe is about 0.125 inch. However, as may be recognized by those of ordinary skill in the pertinent art based on the teachings herein, the coatings may cover all and/or other portions of the blades, as may be applied in a format other than a stripe. Once the coating process is completed, the wound bi-metal strips are allowed to cool, the chamber is brought back to atmospheric pressure, and the coated bi-metal strips are removed and are ready for separating same into the individual blades as described above. Exemplary procedural steps involved in coating utility blades as described above are illustrated in Table 1 below.

TABLE 1

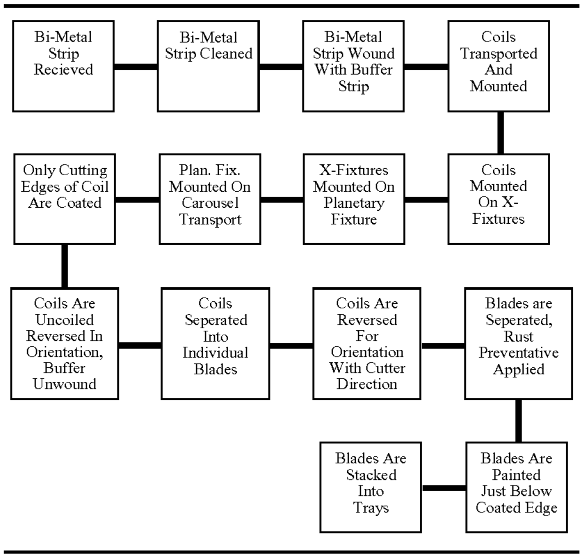

Some types of coatings and methods for providing such coatings are described by Teer, D. G., et al., "Self Lubricating Coatings for the Protection of Cutting and Forming Tools and Mechanical Components", Vacuum Technology & Coating, Society of Vacuum Coaters, October 2000, pp. 48-53, which is incorporated by reference herein. However, other types of coating(s) and method(s), or combinations thereof, also may be used.

Of course, as indicated above, the utility blades and processes of making such blades in accordance with the present invention do not require coating(s).

Accordingly, as may be recognized by those skilled in the pertinent art based on the teachings herein, numerous changes and modifications may be made to the above-described and other embodiments of the composite utility blades and the methods of making such blades of the present invention without departing from the scope of the invention as defined in the appended claims. This detailed description of preferred embodiments is to be taken in an illustrative, as opposed to a limiting sense.

What is claimed is:

1. A composite utility knife blade including a first metal portion forming a backing, a second metal portion forming a cutting edge, and a weld region joining the first and second metal portions, wherein the composite utility knife blade is made in accordance with a method comprising the following steps:

providing an elongated backing strip formed of spring steel, wherein the elongated backing strip includes a first side, a second side, and opposing edges extending between the first and second sides;

providing an elongated wear-resistant steel wire formed of at least one of tool steel and high speed steel;

placing the wire in contact with an edge of the backing strip;

applying thermal energy to the interface between the wire and backing strip to weld the wire to the backing strip and, in turn, forming a composite bi-metal strip defining a first metal portion formed by the steel backing strip, a second metal portion formed by the wear-resistant steel wire, and a weld region joining the first and second metal portions;

heat treating the composite strip;

forming at least one facet on the second metal portion and, in turn, forming a wear-resistant steel cutting edge on the composite strip;

heating the bi-metal strip to an elevated temperature of at least about 1000° F.; and applying a metal nitride coating by physical vapor deposition to at least a portion of the cutting edge of the bi-metal strip at such elevated temperature.

2. A composite utility knife blade as defined in claim 1, wherein the method of making the blade further comprises the step of separating the composite strip into a plurality of blades.

3. A composite utility knife blade as defined in claim 2, wherein the separating step includes die cutting at least one of the first and second metal portions along shear lines axially spaced relative to each other to thereby form a plurality of utility blades from the composite strip.

4. A composite utility knife blade as defined in claim 3, further comprising scoring the composite strip at axially spaced locations to form the shear lines.

5. A composite utility knife blade as defined in claim 3, wherein each shear line is oriented at an acute angle relative to a lateral edge of the first metal portion.

6. A composite utility knife blade as defined in claim 3, further comprising:

cutting indentations in the wear-resistant steel edge of the composite strip at the interface of each shear line and the second metal portion to thereby separate with the indentations the wear-resistant steel cutting edges of adjacent composite utility blades formed from the composite strip;

hardening the composite strip; and then die-cutting only the first metal portion of the hardened composite strip along the axially spaced shear lines to thereby form the plurality of utility blades from the composite strip.

7. A composite utility knife blade as defined in claim 1, wherein the second metal portion of the utility knife blade defines a first predetermined cross-sectional shape, and the method of making the blade comprises providing the elongated wire defining a second predetermined cross-sectional shape that is substantially the same as the first predetermined cross-sectional shape.

8. A composite utility knife blade as defined in claim 7, wherein the second predetermined cross-sectional shape of the wire is one of substantially trapezoidal and substantially rectangular.

9. A composite utility knife blade as defined in claim 7, wherein the second predetermined cross-sectional shape of the wire is approximately a parallelogram.

10. A composite utility knife blade as defined in claim 7, wherein the step of providing a wire includes providing a wire that defines an initial cross-sectional shape, and then shaping the wire into the second predetermined cross-sectional shape that is different than the initial cross-sectional shape.

11. A composite utility knife blade as defined in claim 10, wherein the wire is shaped into the second predetermined cross-sectional shape prior to welding the wire to the backing strip.

12. A composite utility knife blade as defined in claim 10, wherein the initial cross-sectional shape of the wire is substantially round, and the second predetermined cross-sectional shape of the wire is multi-faceted.

13. A composite utility knife blade as defined in claim 12, wherein the second predetermined cross-sectional shape of the wire is selected from the group including: (a) substantially rectangular; (b) substantially trapezoidal; (c) substantially triangular; (d) substantially parallelogram-shaped; and (e) a combination of substantially rectilinear and triangular.

14. A composite utility knife blade as defined in claim 10, wherein the step of shaping the wire into the second predetermined cross-sectional shape includes at least one of: (a) rolling the wire; (b) passing the wire through a Turks Head; and (c) passing the wire through a draw die.

15. A composite utility knife blade as defined in claim 7, wherein the second predetermined cross-sectional shape of the wire and the first predetermined cross-sectional shape of the second metal portion are both triangular.

16. A composite utility knife blade as defined in claim 7, wherein the cross-sectional area of the wire is greater than the cross-sectional area of the second metal portion of the blade.

17. A composite utility knife blade as defined in claim 1, wherein the step of forming at least one facet on the second metal portion includes at least one of grinding, honing and stropping the second metal portion.

18. A composite utility knife blade as defined in claim 1, wherein the heat treating step includes:

hardening the composite strip;

tempering the hardened composite strip; and quenching the hardened composite strip.

19. A composite utility knife blade as defined in claim 1, further comprising hardening the first metal portion to a surface hardness within the range of approximately 38 Rc to approximately 52 Rc.

20. A composite utility knife blade as defined in claim 1, further comprising hardening the second metal portion to a surface hardness within the range of approximately 60 Rc to approximately 75 Rc.

21. A composite utility knife blade as defined in claim 1, further comprising hardening the first metal portion to a first hardness, and hardening the second metal portion to a second hardness greater than the first hardness.

22. A composite utility knife blade as defined in claim 1, wherein the applying step comprises the steps of coating the cutting edge with an inner layer of a functional coating and an outer layer of a decorative coating.

23. A composite utility knife blade as defined in claim 1, wherein the applying step comprises applying an AlTiN coating in a gradient wherein there is a lower concentration of aluminum at the inner side of the coating and a higher concentration of aluminum at the outer side of the coating.

24. A composite utility knife blade as defined in claim 1, wherein the applying step includes winding the bi-metal strip into a coil with a buffer strip located between adjacent windings of the bi-metal strip to form a coil assembly.

25. A composite utility knife blade as defined in claim 24, wherein the buffer strip defines a width that is less than the width of the bi-metal strip and is wound with the bi-metal strip such that the buffer strip exposes a predetermined portion of the bi-metal strip for PVD coating thereon, and covers an adjacent portion of the bi-metal strip to prevent application of the PVD coating on the covered portion.

26. A composite utility knife blade as defined in claim 25, wherein the applying step includes mounting a plurality of bi-metal strip and buffer strip coil assemblies in a PVD coating chamber and spacing the coil assemblies axially and angularly relative to each other.

27. A composite utility knife blade as defined in claim 26, wherein the applying step further includes orienting the coil assemblies in planes approximately parallel to planes defined by a plurality of targets of the PVD coating chamber.

28. A composite utility knife blade as defined in claim 26, further comprising the steps of mounting the plurality of coil assemblies on a rotating fixture, and rotating a plurality of coil assemblies relative to a plurality of targets of the PVD coating chamber during application of the coating thereto.

29. A composite utility knife blade comprising:

a first metal portion defined by a backing strip formed of spring steel, wherein the backing strip defines a first side, a second side, opposing edges extending between the first and second sides, and a surface hardness within the range of approximately 38 Rc to approximately 52 Rc;

a second metal portion defined by a wire formed of at least one of high speed steel and tool steel and defining a cutting edge on an opposite side of the second metal portion relative to the first metal portion, and a surface hardness within the range of approximately 60 Rc to approximately 75 Rc;

a weld region joining the first and second metal portions; and a metal nitride PVD coating and extending over opposite sides of at least a portion of the cutting edge relative to each other.

30. A composite utility knife blade as defined in claim 29, wherein the second metal portion forming the cutting edge is formed by the wire defining a first predetermined cross-sectional shape, and the second metal portion of the composite utility knife blade defines a second predetermined cross-sectional shape that is substantially the same as the first predetermined cross-sectional shape.

31. A composite utility knife blade as defined in claim 30, wherein the first and second predetermined cross-sectional shapes are selected from the group including: (a) substantially rectangular; (b) substantially trapezoidal; (c) substantially triangular; (d) substantially parallelogram-shaped; and (e) a combination of substantially rectilinear and triangular.

32. A composite utility knife blade as defined in claim 29, wherein the PVD coating contains titanium applied in a gradient such that it has a higher concentration of titanium at an interface of the coating and the second metal portion, and a lower concentration of titanium at an outer side of the coating.

33. A composite utility knife blade as defined in claim 29, wherein the coating includes an inner functional coating and an outer decorative coating.

34. A composite utility knife blade as defined in claim 33, wherein the coatings define strips extending along opposite sides of the cutting edge relative to each other.

35. A composite utility knife blade as defined in claim 33, wherein the outer decorative coating is comprised of titanium nitride (TiN).

36. A composite utility knife blade as defined in claim 29, wherein the coating is selected from the group including titanium nitride (TiN), chrome nitride (CrN), aluminum nitride (AlN), aluminum titanium nitride (AlTiN), and combinations thereof.

37. A composite strip for forming therefrom at least one utility knife blade, wherein the utility knife blade includes a first metal portion forming a backing, a second metal portion forming a cutting edge, and a weld region joining the first and second metal portions, wherein the composite strip comprises:

first means formed of spring steel for forming an elongated metal backing of the utility knife blade and defining a first surface hardness within the range of approximately 38 Rc to approximately 52 Rc;

second means formed of at least one of high speed steel and tool steel for forming a sharpened, elongated metal cutting edge of the utility knife blade and defining a second surface hardness within the range of approximately 60 Rc to approximately 75 Rc;

a weld region joining the first and second means; and a metal nitride PVD coating extending over opposite sides of at least a portion the cutting edge relative to each other.

38. A composite strip as defined in claim 37, wherein the first means is a first metal portion defined by an elongated backing strip formed of spring steel.

39. A composite strip as defined in claim 37, wherein the second means is an elongated wire formed of at least one of tool steel and high speed steel.

40. A composite strip as defined in claim 37, wherein the second metal portion forming a cutting edge of the utility knife blade defines a first predetermined cross-sectional shape, and the second means defines prior to welding the second means to the first means a second predetermined cross-sectional shape that is substantially the same as the first predetermined cross-sectional shape that is substantially the same as the first predetermined cross-sectional shape, and wherein the first and second predetermined cross-sectional shapes are selected from the group including: (a) substantially rectangular; (b) substantially trapezoidal; (c) substantially triangular; (d) substantially parallelogram-shaped; and (e) a combination of substantially rectilinear and triangular.

41. A composite strip as defined in claim 37, wherein the PVD coating contains titanium applied in a gradient such that it has a higher concentration of titanium at an interface of the coating and the second metal portion, and a lower concentration of titanium at an outer side of the coating.

42. A composite strip as defined in claim 37, wherein the coating includes an inner functional coating and an outer decorative coating.

43. A composite strip as defined in claim 42, wherein the outer decorative coating is comprised of titanium nitride (TiN).

44. A composite strip as defined in claim 37, wherein the coating is selected from the group including titanium nitride (TiN), chrome nitride (CrN), aluminum nitride (AlN), aluminum titanium nitride (AlTiN), and combinations thereof.

* * * * *